(12) United States Patent
Sasai et al.

(10) Patent No.: US 8,332,398 B2
(45) Date of Patent: Dec. 11, 2012

(54) DATABASE SYSTEM IN WHICH LOGICAL PRINCIPLES FOR A DATA RETRIEVAL PROCESS CAN EVOLVE BASED UPON LEARNING

(75) Inventors: Kosuke Sasai, Kobe (JP); Masahiro Hayakawa, Amagasaki (JP); Yuji Ikeda, Kobe (JP); Naoaki Suganuma, Kakogawa (JP)

(73) Assignees: Minolta Co., Ltd., Osaka (JP); Yuji Ikeda, Hyogo (JP); Naoaki Suganuma, Hyogo (JP)

( * ) Notice: Subject to any disclaimer, the term of this patent is extended or adjusted under 35 U.S.C. 154(b) by 2728 days.

(21) Appl. No.: 10/446,941

(22) Filed: May 29, 2003

(65) Prior Publication Data

US 2004/0153463 A1   Aug. 5, 2004

(30) Foreign Application Priority Data

Jan. 31, 2003   (JP) ................................ P2003-023053

(51) Int. Cl.
   *G06F 17/30* (2006.01)
(52) U.S. Cl. ......... 707/728; 707/706; 707/722; 707/736
(58) Field of Classification Search .................. 707/1–6, 707/100, 104.1
   See application file for complete search history.

(56) References Cited

U.S. PATENT DOCUMENTS

| | | | |
|---|---|---|---|
| 5,202,422 A | 4/1993 | Hiatt et al. | |
| 5,535,382 A * | 7/1996 | Ogawa ................................. 1/1 |
| 5,879,912 A | 3/1999 | Roth | |
| 5,959,177 A | 9/1999 | Hein et al. | |
| 6,046,040 A | 4/2000 | Nishiguchi et al. | |
| 6,054,304 A | 4/2000 | Taniguchi et al. | |
| 6,314,434 B1 | 11/2001 | Shigemi et al. | |
| 6,331,418 B1 | 12/2001 | Roth | |
| 6,539,377 B1 * | 3/2003 | Culliss ............................. 707/5 |
| 6,571,239 B1 | 5/2003 | Cole et al. | |

(Continued)

FOREIGN PATENT DOCUMENTS

JP   11-53394   2/1999

(Continued)

OTHER PUBLICATIONS

United States Office Action issued in U.S. Appl. No. 12/000,044, mailed Sep. 29, 2010.

(Continued)

*Primary Examiner* — Hosain Alam
*Assistant Examiner* — Sangwoo Ahn
(74) *Attorney, Agent, or Firm* — McDermott Will & Emery LLP

(57) ABSTRACT

The present invention provides a database system capable of dealing with dynamic changes in an event that vary continuously with time. A database system outputs a retrieval output from data in response to a user's retrieval request on the basis of a retrieval logic. The retrieval logic is allowed to evolve on the basis of a logical model. This logical model establishes a general relationship which leads results from conditions relating to a group of events that are dealt by a data group. Moreover, a database system optimizes a data structure on the basis of the logical model. The logical model can be transferred in a separated manner from the specific data contents of the data group. Therefore, the logical model can be exported to another database system of the same kind, and also imported from another data base system of the same kind.

21 Claims, 29 Drawing Sheets

U.S. PATENT DOCUMENTS

| | | | |
|---|---|---|---|
| 6,598,047 B1 * | 7/2003 | Russell et al. | 707/5 |
| 6,602,684 B1 | 8/2003 | Umana et al. | |
| 6,653,459 B1 | 11/2003 | Von Schaewen | |
| 6,701,314 B1 * | 3/2004 | Conover et al. | 707/7 |
| 6,751,614 B1 * | 6/2004 | Rao | 707/5 |
| 6,807,545 B1 * | 10/2004 | VanDamme | 707/102 |
| 2001/0055584 A1 | 12/2001 | McKenzie et al. | |
| 2003/0037050 A1 * | 2/2003 | Monteverde | 707/6 |
| 2004/0072290 A1 | 4/2004 | Umana et al. | |
| 2004/0181827 A1 | 9/2004 | Schaewen | |

FOREIGN PATENT DOCUMENTS

| | | |
|---|---|---|
| JP | 2001-331315 | 11/2001 |
| JP | 2002-230021 | 8/2002 |

OTHER PUBLICATIONS

United States Office Action issued in U. S. Appl. No. 12/000,044 dated Mar. 17, 2010.

* cited by examiner

XML DOCUMENT

```
<title> SAMPLE DOCUMENT </title>
<author> TARO YAMADA </author>
<KEYWORD>＊＊＊</KEYWORD>
<preface>
 ． ． ． ．
</preface>
<text>
 ． ． ． ．
</text>
<conclusion>
 ． ． ． ．
</conclusion>
```
～201

FIG. 30

```
TEACHING MATERIAL
  STUDENT NAME  TARO YAMADA
  SUBJECT  MATHEMATICS
  UNIT  PRIMARY FUNCTION
    LECTURE-CENTERED TYPE
      TEACHING  OOOOOOOOOO
      MATERIAL  OOOOOOOOOO

CAUTIONS  OOOOOOOOOO
                OOOOOOOOOO

EXAMINATIONS  OOOOOOOOOO
                    OOOOOOOOOO
```
— 460

FIG. 31

EDUCATIONAL ACHIEVEMENTS REGISTRATION — 470

STUDENT NAME | 472 TEACHING MATERIAL | DEGREE OF UNDERSTANDING

471 — TARO YAMADA | BALANCE TYPE | A — 473

SUBJECT | UNIT

474 — MATHEMATICS | PRIMARY FUNCTION — 475

REGISTER   END 476   455

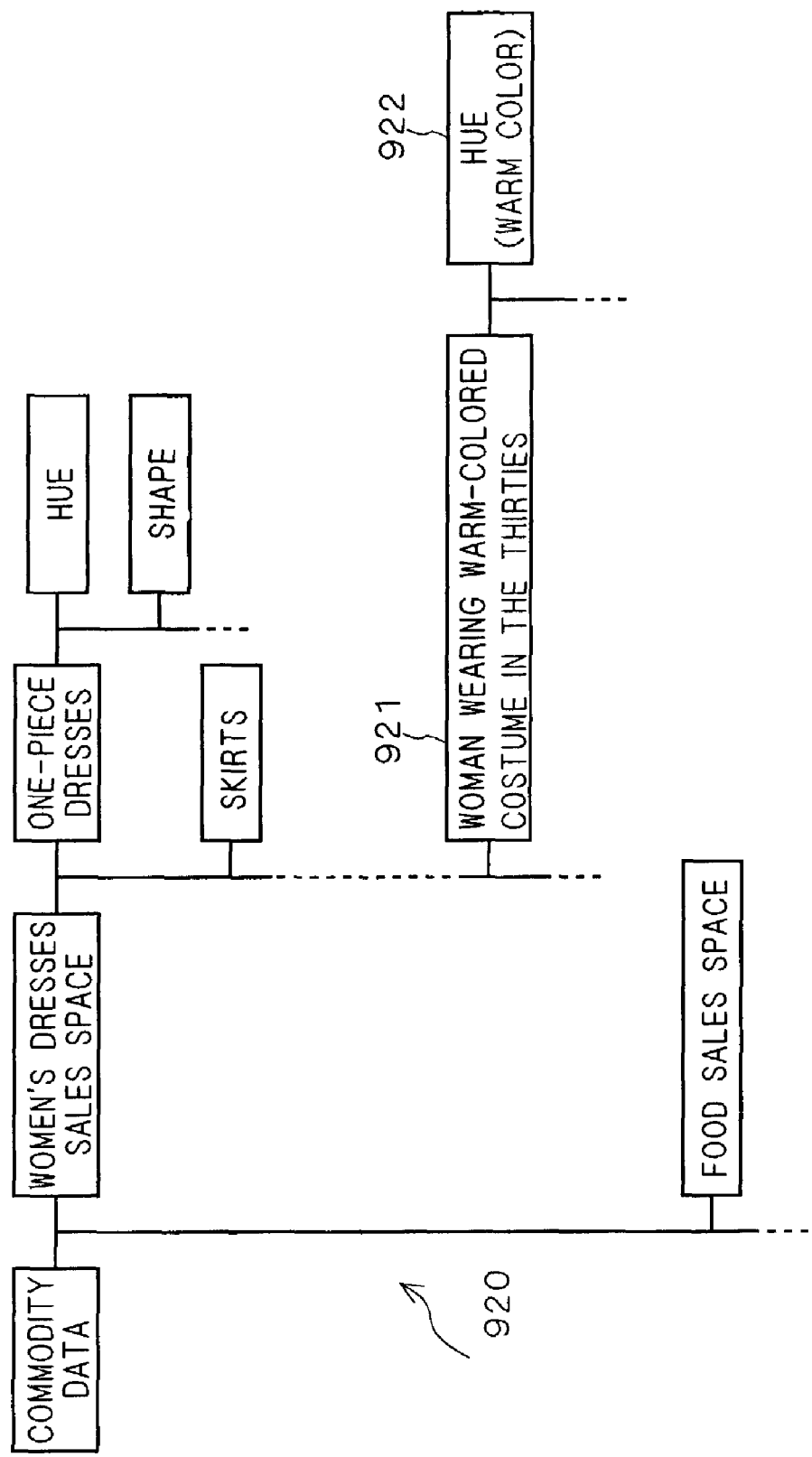

DATABASE SYSTEM IN WHICH LOGICAL PRINCIPLES FOR A DATA RETRIEVAL PROCESS CAN EVOLVE BASED UPON LEARNING

This application is based on application No. 2003-023053 filed in Japan, the contents of which are hereby incorporated by reference.

BACKGROUND OF THE INVENTION

1. Field of the Invention

The present invention relates to a database system capable of dealing with dynamic changes in an event.

2. Description of the Background Art

In recent years, along with the developments of computer systems and computer networks, databases that store and manage a great amount of computerized data has been widely used. In these databases, a relational database (RDB), in which data describing events is represented by two-dimensional tables and the relation between the tables is defined, has been mainly used. In the RDB, in most cases, the data structure is standardized in order to provide efficient database operations.

However, in the case of the RDB having the standardized data structure, it becomes difficult to locally operate data, and the resulting disadvantage is that it is not possible to flexibly deal with changes in an event. For this reason, various techniques have been developed to flexibly deal with changes in an event.

With respect to the techniques for flexibly dealing with changes in an event, mainly two techniques have been proposed: a technique of flexibly changing the data structure in response to changes in an event; and a technique of flexibly changing an accessing method to the database in response to changes in an event.

With respect to the technique of flexibly changing the data structure in response to changes in an event, a technique of an object oriented database (OODB) in which data and an algorithm are integrally prepared so that local data operations can be carried out has been proposed (Japanese Patent Application Laid-Open No. 2001-331315). Moreover, another technique which uses an architectural database having an architectural data structure has been proposed (Japanese Patent Application Laid-Open No. 11-296544 (1999)). The technique disclosed in Japanese Patent Application Laid-Open No. 11-296544 (1999) features in that the history of changes in a data structure is stored, and that, even when there is a change in the data structure, the structure prior to the change is accessible.

Moreover, with respect to the technique of flexibly changing an accessing method to the database in response to changes in an event, a technique which utilizes a user profile in which the history of a user's database operations is written for an assisting purpose so as to improve the database accessing efficiency has been proposed (Japanese Patent Application Laid-Open Nos. 11-53394 (1999) and 2002-230021).

In accordance with the techniques of Japanese Patent Application Laid-Open Nos. 2001-331315 and 11-296544 (1999), although it is possible to flexibly deal with changes in a singly-occurring event, it is not possible to deal with dynamic changes in an event that is continuously varied with time.

Moreover, in accordance with the techniques of Japanese Patent Application Laid-Open Nos. 11-53394 (1999) and 2002-230021, it is also possible to deal with changes in an event. However, these techniques are based on the assumption that the data of a database to be accessed has a specific data structure. Further, these techniques do not function sufficiently unless this data structure properly reflects the corresponding event. For this reason, even in the case when these techniques become effective immediately after the start of the application of the database, the database accessing operation becomes inefficient when the data structure fails to maintain an optimal state due to changes in an event. In other words, these techniques fail to effectively deal with dynamic changes in an event that is continuously varied with time.

SUMMARY OF THE INVENTION

The present invention has been made to solve the above-mentioned problems, and its object is to provide a database system capable of dealing with dynamic changes in an event which is continuously varied with time.

The present invention is directed to a database system.

In accordance with one aspect of the present invention, a database system includes: a data store for storing a data group; a logical model holding unit for holding a logical model which represents logical principles in a data retrieval process in an independent manner from respective data contents of the data group; a retrieval logic applying unit which creates a retrieval logic corresponding to a retrieval request on the basis of the logical model, and obtains a retrieval output corresponding to the retrieval request by retrieving the data group in accordance with the retrieval logic; a logic analyzing unit which analyzes a logical path connecting conditions to corresponding results in a group of events relating to the data group; and a logical model updating unit which updates the logical model so as to be evolved, each time a new combination between new conditions and corresponding new results is given, on the basis of an analysis of a logical path of the new combination carried out by the logical analyzing unit.

In accordance with the database system, the logical model is constructed in a manner so as not to depend on specific contents of a data group, and the results of an analysis by a logical path connecting known conditions of a group of events relating to information of the data group to the corresponding known results are reflected to the logical model so that it becomes possible to deal with dynamic events that are continuously evolved with time.

The present invention is also directed to a data retrieval method in a system.

In another aspect of the present invention, a data retrieval method for a data system, includes the steps of: (a) storing a data group; (b) holding a logical model which represents logical principles in a data retrieval process in an independent manner from data contents of the data group; (c) creating a retrieval logic corresponding to a retrieval request on the basis of the logical model, and outputting the results of retrieval corresponding to the retrieval request by retrieving the data group in accordance with the retrieval logic; (d) analyzing a logical path which connects conditions to corresponding results in a group of events relating to the data group; and (e) updating the logical model so as to be evolved, each time a new combination between new conditions and corresponding results is given, on the basis of an analysis of a logical path of the combination.

In accordance with the data retrieval method in a database system, the logical model is constructed in a manner so as not to depend on specific contents of a data group, and the results of an analysis by a logical path connecting known conditions of a group of events relating to information of the data group to the corresponding known results are reflected to the logical model so that it becomes possible to deal with dynamic events that are continuously evolved with time.

These and other objects, features, aspects and advantages of the present invention will become more apparent from the following detailed description of the present invention when taken in conjunction with the accompanying drawings.

DESCRIPTION OF THE DRAWINGS

FIG. 30 shows a schematic view that indicates a teaching-material display screen;

FIG. 31 shows a schematic view that indicates an educational achievement registering screen;

FIG. 44 shows an architectural diagram that indicates an architectural structure of commodity data.

DESCRIPTION OF THE PREFERRED EMBODIMENTS

Basic Concept

Figure 1:
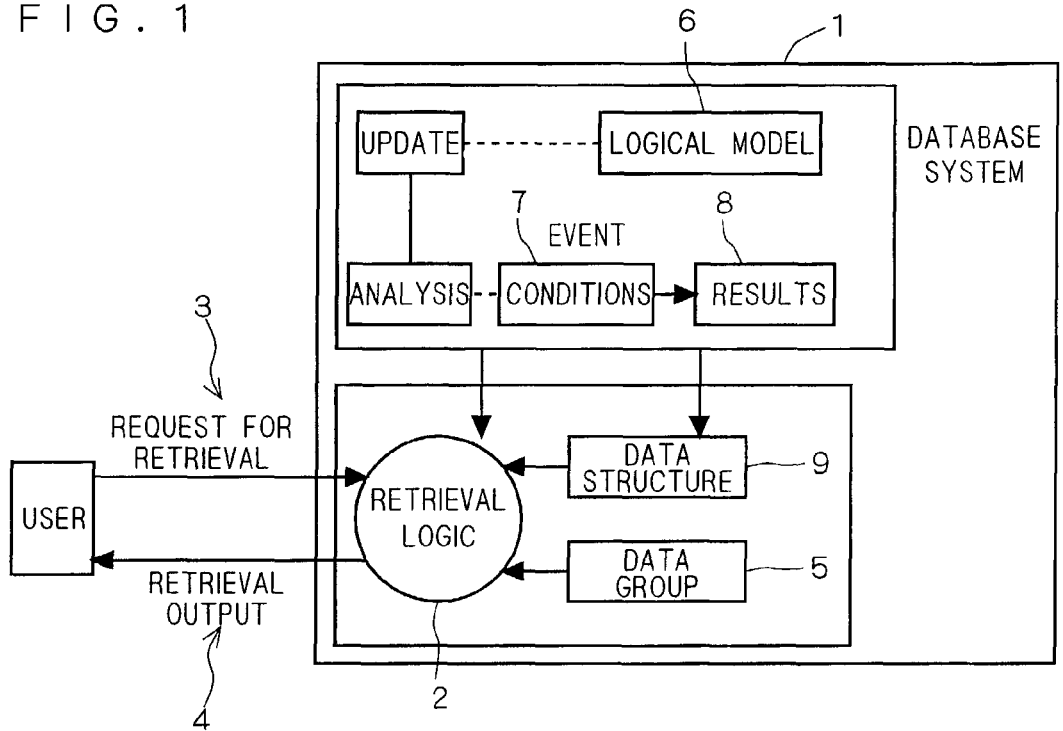
FIG. 1 shows a conceptual block diagram that indicates the basic concept of a database system in accordance with the present invention.

Referring to a conceptual block diagram of FIG. 1, the following description will discuss the basis concept of a database system 1 in accordance with the present invention. This database system 1 is arranged so that, upon receipt of a user's retrieval request 3, a retrieval output 4 is selected from a data group 5 by applying a retrieval logic 2 to the retrieval request 3. The retrieval logic 2 is specified depending on the specific contents of the retrieval request 3; and a logical model (basic principle forming a logical pattern) 6, which serves as an upper-level indicator upon specifying this retrieval logic 2, is held in the database system 1.

This logical model 6 gives a general relationship that directs results 8 from conditions 7 relating to a group of events that form corresponding information stored in the data group 5. Both of the logical model 6 and the retrieval logic 2 are similar to each other in that they are "logics"; however, in terms of mathematical analogy, the logical model 6 corresponds to "a general solution" which connects the retrieval request 3 and the retrieval results 4, while the retrieval logic 2 corresponds to "a specific solution" or "a numeric solution" that is used for giving the retrieval results 4 when the data group 5 and the retrieval request 3 are practically specified. In other words, the logical model 6 gives a global rule which has a wider range of applications since it represents a "functional" relationship or "mapping" as a model, while the retrieval logic 2 gives a local, temporary rule that is used for obtaining the retrieval results 4 from the retrieval request 3 at a specific point of time by practically representing the logical model 6 in accordance with the corresponding situations.

The database system 1 of the present invention analyzes logical paths connecting conditions and results in a group of events that are objects of information in a group of data, and updates the logical model 6 on the basis of the results of analysis. A retrieval logic 2, which is applied upon receipt of a new retrieval request 3 thereafter, has new logical contents that are specified on the basis of the updated logical model 6. Here, in the case when the logical model 6 is a model that regulates the rule of the retrieval of the database itself, the contents of the retrieval request 3 typically form "conditions", and the data finally selected by the user from the retrieval outputs 4 form "results".

In this manner, the database system 1 of the present invention is characterized in that the logical model 6 is allowed to continuously evolve with time and the retrieval logic 2 is also allowed to continuously evolve accordingly.

Moreover, the logical model 6 is arranged as a model that does not depend on specific data contents accumulated in the data group 5. In terms of mathematical analogy in the same manner as described above, this model is described as follows.

Supposing that the relationship between a retrieval request x and a retrieval output y is represented by $y=f(x)$, even when the numeric relationship such as $f(1)=5$ and $f(3)=10$ is determined specifically, the relationship is used for only the corresponding data group, and fails to provide specific values of the input and output with respect to another data group. In other words, such a specific retrieval logic is dependent on the specific contents of the data group, and is not applicable separately from the data group. In contrast, if this is held as "a functional form" of $y=f(x)$ or a model of rules used for directing this form, the model can also be applied to another data group so as to identify a specific retrieval logic. The logical model 6 is provided as such a model, and its "evolution" corresponds to continuous changes of parameters contained in, for example, the function $f(x)$, which are made by analyzing the relationship between the conditions of a retrieval process and the results thereof.

In particular, the logical model 6 is not a simple "inorganic" set of routes that connect the conditions and the results, but is allowed to reflect "a tendency" of a group of events; thus, it becomes applicable to another group of data or another user in which such "a tendency" is commonly expected. In other words, the relationship between the conditions of a retrieval process and the results thereof is analyzed as "meaning", and this is reflected to the logical model 6 so that the logical model 6 is allowed to form an organic existence that has an independently evolving property.

Moreover, this database system 1 optimizes a data structure 9 on the basis of the logical model 6. In other words, the data structure 9 is not a fixed structure, but is allowed to evolve dynamically as one function of the logical model 6. Thus, in the database system 1, the retrieval process is efficiently executed by the retrieval logic 2.

In this manner, the logical model that is widely applicable is held independently from the specific contents of the data group 5, that is, held in a manner so as to be separable from the data group 5 variably; thus, it is possible to increase the extensibility of the logical model 6, and consequently to carry out such a process that the logical model 6 can be transplanted to another database system.

The group of events that form an application subject of the logical model 6 may be a group of events relating to retrieving operations of the database system 1, or a group of events other than these, for example, natural phenomena, human phenomena, social phenomena or the like occurring outside the system. Various application examples will be described later. In the case of a group of events other than those relating to the database system 1 itself (typically, a group of events relating to its retrieving operations), experience information that forms a basis of the logical relationship between the conditions 7 and the results 8 in the group of events occurs outside the database system 1. For example, in an educational teaching material database system which will be described later as a specific example, the relationship between the cause and the results, for example, the relationship between the use of a specific teaching material for a specific student and the effects of learning, is an event occurring outside the database system 1. For this reason, such information with respect to the cause-effect relationship occurring outside the system may be manually inputted to the database system 1 so that the conditions 7 and the results 8 are specified, and the results of analyses with respect to the correspondence relationship can be reflected to the logical model 6 (that is, retrieval logic 2 to be used thereafter). In other words, the evolution of the logical model 6 is allowed to take place not only by events occurring inside the database system 1, but also by events occurring outside the system (growth of the logical model 6). Moreover, in the case when natural phenomena or the like are used as a group of events, a detection means, such as a sensor, may be used so as to input external information by using an on-line system.

The above description has described the general basic concept of the database system 1, and the following description will discuss embodiments corresponding to the database system 1 of the present invention by reference to specific examples, and specific application examples thereof.

Hardware Configuration

Figure 2:
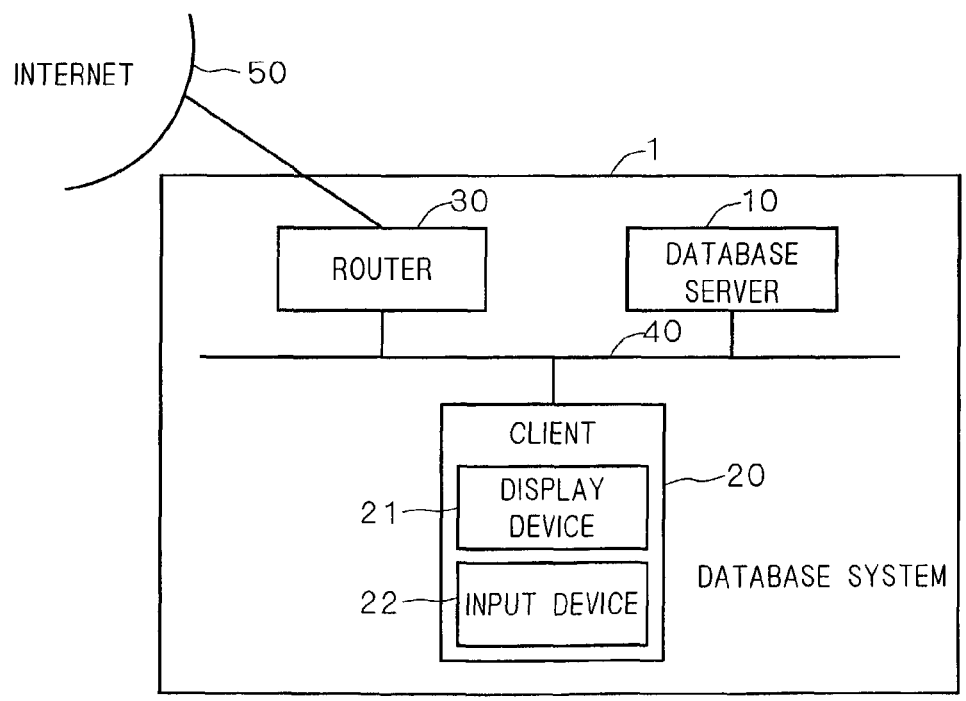
FIG. 2 shows a block diagram that describes a hardware configuration of the database system in accordance with an embodiment of the present invention.

Referring to a block diagram of FIG. 2, the following description will discuss a hardware configuration of the database system in accordance with the present embodiment.

The database system 1 is a client-server-type database system that is formed on a network. The database system 1 is provided with a database server 10, a client 20 and a router 30. These database server 10, client 20 and router 30 are connected to each other by the network 40 so as to communicate with each other. The network 40 may be either a cable LAN (Local Area Network) or a radio LAN, or the cable LAN and the radio LAN may be used in a mixed manner. Moreover, one portion or the entire portion of the network 40 may be constructed by using public telephone lines.

The database server 10 is a computer provided with a storage medium for storing data. A database managing system (DBMS) and middle ware are installed in the database server 10. Thus, the database server 10 is allowed to function as a main body unit in the database system 1. The database server 10 is allowed to respond to instructions from the client 20 given through the network 40.

The client 20 is a computer that is provided with a display device 21 such as a CRT display and an input device 22 such as a keyboard. A database-use application is installed in the client 20. Thus, the client 20 is allowed to transmit an instruction to the database server 10 through the network 40. Moreover, a response (retrieval output, etc.) to the transmitted instruction from the database server 10 can be displayed on the display device 21. With these devices, the client 20 is allowed to function as an input-output terminal (user interface) of the database system 1.

A router 30 connects the network 40 to the internet 50 that is an external network. The router 30 allows the database system 1 to acquire data from an external data source.

In the above-mentioned database system 1, a simple case in which the database server 10, client 20 and router 30, each being single, are placed has been described; however, the database system of the present invention is not intended to be limited by this arrangement. In other words, a plurality of database servers, clients and routers may be installed. Moreover, one portion or the entire portions of these may be formed as an integral part. Furthermore, computers having different platforms may be used as the database servers and the clients in a mixed manner.

Functions

Referring to a block diagram (FIG. 3) that describes the relationship between subsystems, the following description will discuss functions of the database system 1 for each of the subsystems.

User Interface 110

The database system 1 is provided with a user interface 110 that forms a means for allowing the user to operate the database system 1. The user interface 110 can output a user's retrieval request to an execute composition unit 120. Moreover, the user interface 110 can output additional data inputted by the user to a data storage 130. Moreover, a response from the database system 1 to the user retrieval request can be displayed.

Execute Composition Unit 120

An execute composition unit 120, which converts a retrieval request to a query, is installed in the database system 1, and the execute composition unit 120 corresponds to an essential portion of "retrieval logic 2" of FIG. 1. The execute composition unit 120 converts the retrieval request outputted from the user interface 110 to a query. This query has a query structure that is specified by a query structure model 121. Moreover, the query thus converted is outputted to a query engine mining unit 150. Moreover, the execute composition unit 120 acquires data extracted by the query engine mining unit 150, and outputs the resulting data to the user interface 110. At this time, the execute composition unit 120 is allowed to reflect a knowledge-structure-discovery model 161 (KSD; Knowledge, Structure, Discovery) stored in a realization store 160, which will be described later, to the data to be outputted. In other words, the KSD model can be reflected to the retrieval logic. More specifically, the data required by the user can be estimated through the KSD model 161 so that it becomes possible to preferentially output the resulting data to the user interface 110 or to output a method for a retrieval request that allows an appropriate extraction of the data to the user interface 110. Moreover, the execute composition 120 can maintain the contents of inputs and outputs to and from the user interface 110 during a sequence of database operations by the user, and output them to the realization store 160.

Data Store 130

The database system 1 includes a data store 130 in which a data group 132 is stored. The data group 132 is stored in the data store 130 with being kept in conformity with a data structure specified by a data structure model 131. Here, the data structure model 131 can be updated by a restructure engine 170, which will be described later.

Translator 140

The database system 1 is provided with a translator 140 which acquires data from an external data source. The translator 140 analyzes data obtained from the external data source 180, and converts the data to data that is in conformity with the data structure model 131. The data thus converted is outputted to the data store 130, and added to the data group 132.

Figure 4:
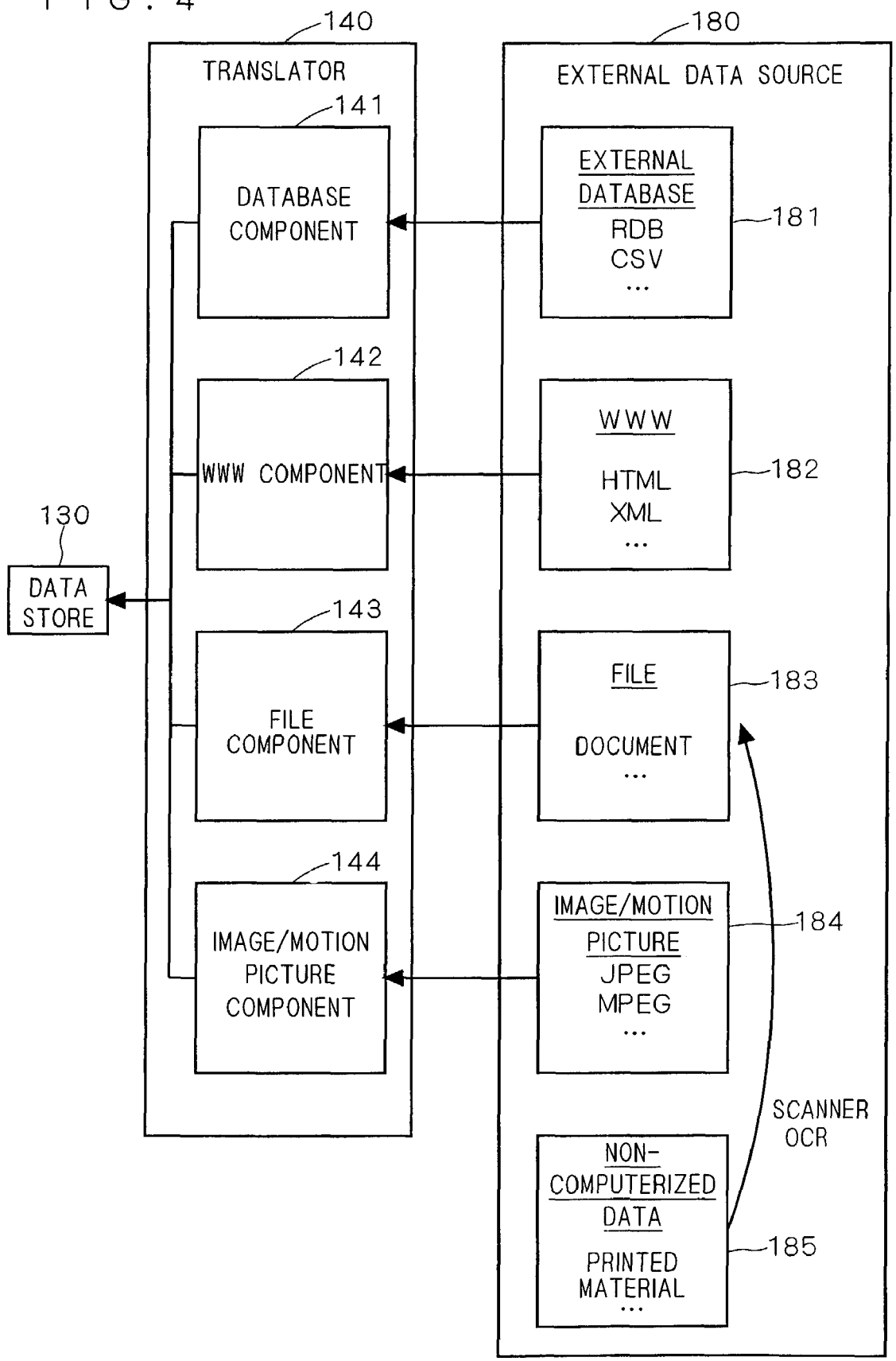
FIG. 4 shows a block diagram that describes a detailed configuration of a translator.

As shown in a block diagram of FIG. 4, components 141 to 144 are installed in the translator 140 for each of the kinds of data sources and data formats. More specifically, a database component 141, a WWW (World Wide Web) component 142, a file component 143 and an image/motion picture component 144, which respectively correspond to an external database 181 of the external data source 180, a WWW 182, a file 183 and images/motion pictures 184, are installed. By adding components corresponding to a new data source and data format, the translator 140 is allowed to convert the data of new data source and data format.

Moreover, non-computerized data 185 such as a printed matter is converted to digital computerized data by using a digitizing means such as a scanner and an OCR, and then processed by the translator 140.

Query Engine Mining Unit 150

The database system 1 is provided with a query engine mining unit 150 which extracts data matched to a query from the data group 132. The query engine mining unit 150 carries out a pattern matching process between a query inputted from the execute composition unit 120 and the data group 132 stored in the data store 130, and extracts data having matched pattern with query. Moreover, by carrying out a full text retrieval using the terminal element of the query inputted from the execute composition unit 120 as a key word, it extracts data containing the key word. Furthermore, the query engine mining unit 150 outputs the extracted data to the execute composition unit 120.

Realization Store 160

The database system 1 is provided with a realization store 160. A KSD model 161, which is a logical model that directs the results from conditions relating to unknown events in the group of events that are dealt by the database system 1, is stored in the realization store 160. The realization store 160 holds "logical model 6" of FIG. 1, and also corresponds to elements that allows it to evolve. The KSD model 161 can be updated on demand by a KSD model creating unit 162 which analyzes logical paths between conditions relating to known events and the results, and specifies the characteristics of logical paths as a logical model. In other words, the KSD model creating unit 162 analyzes the correlation between the conditions and the results, and specifies the cause-effect relationship on the basis of the known events in the specific group of events. Moreover, on the basis of the results of the specifying processes, the KSD model creating unit 162 can update the KSD model 161. Thus, upon receipt of conditions relating to an unknown event, the realization store 160 makes it possible to estimate the results by utilizing the specified cause-effect relationship.

The above-mentioned conditions and results may be related to database operations by the user, or may be data other than this. With respect to the events relating to the database operations by the user, for example, a keyword, used by the user upon retrieval request, forms a condition, and information selected by the user from the retrieval output from the database systems form the results. With respect to the events other than the database operations by the user, for example, in a school educational teaching material database, a teaching material outputted from the database system 1 in response to a user's retrieval request forms a condition, and the educational achievements by the use of the teaching material form the results. These educational achievements are inputted to the database system 1 through a predetermined sequence of processes.

Moreover, the realization store 160 is not a computer that simply calculates the correlation between the conditions obtained up to a specific point of time, but a dynamic learning device that evolves in accordance with a lapse of time (accumulation of database use history). Therefore, the device is arranged so that, in the case when the same condition and results are repeated, it does not simply specify the same logical model repeatedly, but comes to have an improved result-predicting capability, as the number of repetitions increases. In other words, it is designed so that, by continuously carrying out learning processes, it is allowed to have better understanding of meaning between the condition and the results. In other words, it is designed so as to carry out additional learning. Thus, in the case when the logical path from a condition to the results is varied as time elapses, the realization store 160 is allowed to gradually change the logical model (that is, step by step or continuously) in response to a change in the logical path, so as to continuously maintain and improve the result-predicting capability. From this point of view the realization store 160 is not a computer for simply calculating the correlation, but an intelligent artificial intelligence capable of making dynamic determinations.

Here, the degree of contribution of the above-mentioned additional learning to the result-predicting capability can be designed in various manners in accordance with database systems. In other words, with respect to a database system in which learning obtained in recent past is more important than learning obtained in farther past (for example, a database system designed for observing seasonal fashions and popular commodities in retail business), the realization store 160 is arranged so that old learning is "forgotten" little by little with a greater degree of contribution of the additional learning being set. Moreover, with respect to a database system in which both of the farther past and the recent past are important in the same degree (for example, database system designed for document retrieve in a mature technical field), the realization store 160 is arranged so that the degree of contribution of the additional learning is set to be comparatively smaller, while the contribution of results of old learning to the result-predicting capability is maintained for a long period of time.

Next, the following description will discuss "logical paths" and "logical models" in the realization store 160 in more detail. First, suppose that conditions (for example, "keyword" in a retrieving process) are represented by condition $A(i)$ ($i=1, 2, \ldots, n$), and that the results corresponding to condition $A(i)$ are represented by result $B(i)$. In this case, respective corresponding relationships between condition $A(i) \rightarrow B(i)$ correspond to "logical paths". Further, a general relationship (mapping) f: condition group A→result group B, which contains a plurality of logical paths, $i=1, 2, \ldots, 3$, forms a "logical model", and the following equations hold:

Condition group $A=\{A(1), A(2), \ldots, A(n)\}$,

Result group $B=\{B(1), B(2), \ldots, B(n)\}$.

In the case when condition $A(i)$ and result $B(i)$ are given as numeric values, the mapping f forms a mathematical function. Since the mapping f has a general relationship, it can be used for estimating result $B(j)$ with respect to a new condition $A(j)$. In an actual database system, the mapping f includes not only a case in which a completely correct result is given, but also an approximation relationship in which an approximately correct result is given; however, as the number of samples n increases, the precision or the degree of approximation of the mapping f is improved. In other words, as the frequency of use of the database system 1 increases, the realization store 160 is allowed to predict the result more correctly. From this point of view, the realization store 160 can be called as "evolving database" which carries out "learning" autonomously.

Further, the mapping f is changeable with time. In other words, in the case when, after a lapse of time, to the above-mentioned n-number of conditions $A(i)$ and results $B(i)$, k-number of new conditions:

$A'=\{A(n+1), A(n+2), \ldots, A(n+k)\}$ and k-number of new results:

$B'=\{B(n+1), B(n+2), \ldots, B(n+k)\}$ are added, the mapping f is evolved so as to reflect the following relationships:
 a set formed by combining a plurality of condition groups, that is, $A+A'$; and
 a set formed by combining a plurality of result groups, that is, $B+B'$.

For this reason, when mapping f': $A' \rightarrow B'$ is different from the mapping f, the mapping f is revised by taking the mapping f' into consideration. This process corresponds to the above-mentioned additional learning. Of course, when the mapping f' is the same as the mapping f, the mapping f is not revised.

Moreover, the mapping f is generated in a separated manner from the data group 132. For this reason, the mapping f is not a person-related matter that is applicable to only a specific user or group of users (hereinafter, simply referred to as the user), and can be usable in an extended manner. More specifically, with respect to mapping f obtained with respect to a specific user, it is applicable to other users. Furthermore, a plurality of pieces of mapping $f_1$ and $f_2$ may be combined to form new mapping, for example,
 linearly combined mapping: $c_1 f_1 + c_2 f_2$ (where $c_1$ and $c_2$ are constants) may be formed and utilized.

Here, with respect to the above-mentioned learning, a neural network and a rule base are preferably used. In examples which will be described later, referring to simple examples, descriptions will be given of methods for applying a neural network and a rule base to the database system.

Restructure Engine 170

Figure 5:
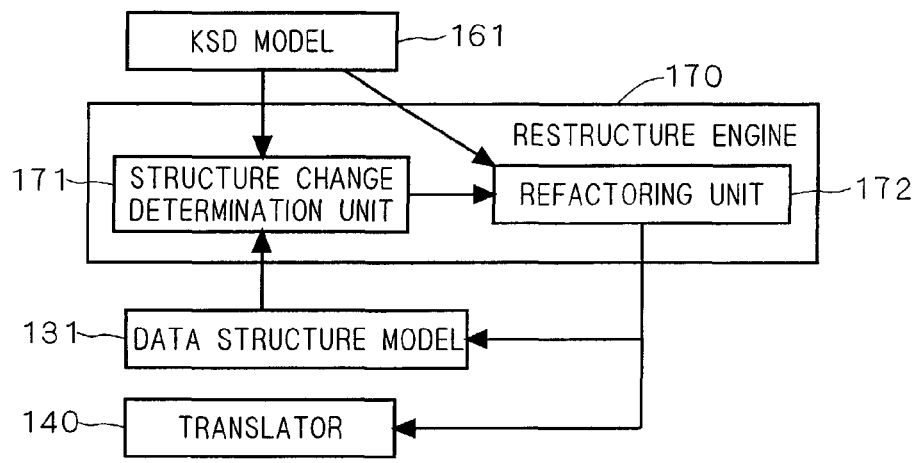
FIG. 5 shows a block diagram that describes a detailed configuration of a restructure engine.

The database system 1 is provided with a restructure engine 170 which optimizes the data structure. As shown in a block diagram of FIG. 5, this restructure engine 170 has a structure-change determining unit 171 and a refactoring unit 172. This structure-change determining unit 171 compares the KSD model 161 with the data structure model 131 so as to determine whether or not the data structure model 131 properly reflects the KSD model 161. Moreover, in the case when the data structure model 131 does not reflect the KSD model 161, the structure-change determining unit 171 outputs a structure-change instruction signal to the refactoring unit 172. In response to this structure-change instruction signal, the refactoring unit 172 changes the data structure model 131 so as to reflect the KSD model 161. Moreover, the translator 140 is updated so as to be suitable for the data structure model 131 that has been changed.

Figure 6:
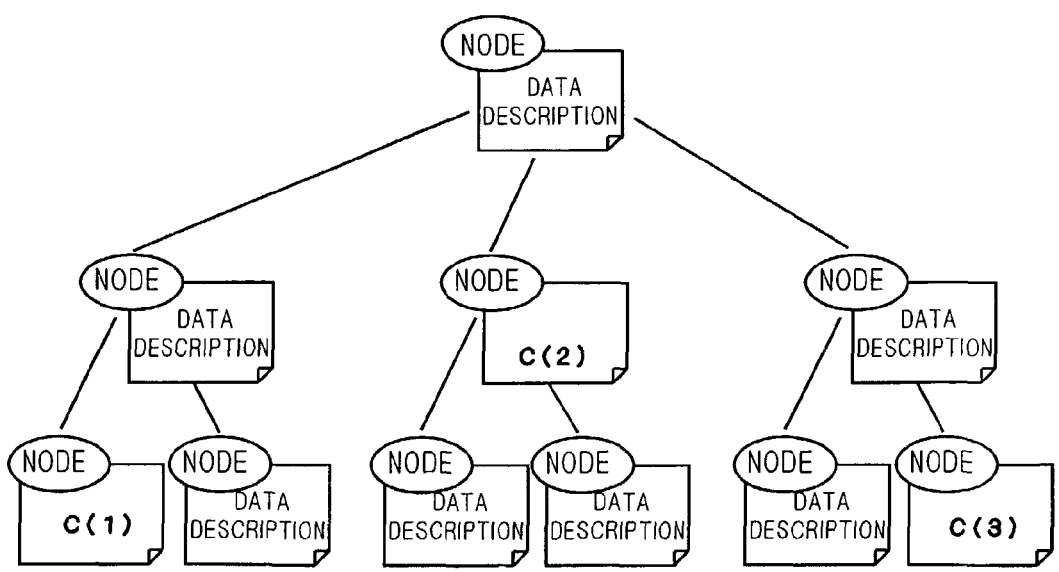
FIG. 6 shows an architectural diagram that indicates an architectural structure of a data structure model.
Figure 7:
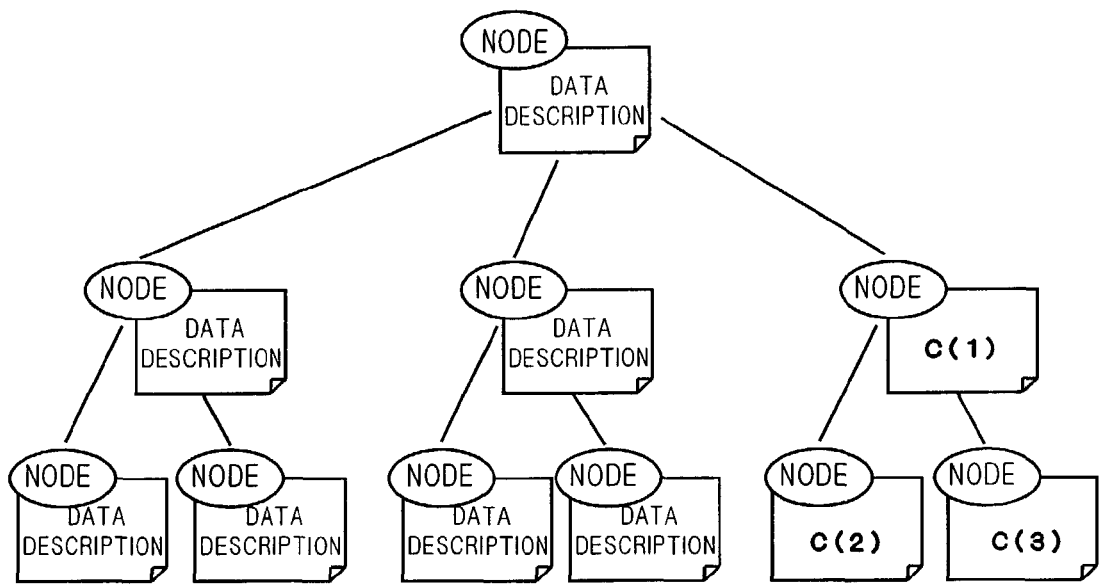
FIG. 7 shows an architectural diagram that indicates an architectural structure of a data structure model.

Referring to a specific example, the following description will discuss the change in the data structure model 131. This description exemplifies a case in which the data structure model 131 has a data structure of a hierarchical data structure. In the case when a plurality of data elements $C(i)$ ($i=1, 2, 3$), which are predicted to be outputted by the KSD model 161 at a high frequency, are described on separated nodes in a scattered manner as shown in a hierarchical drawing in FIG. 6, the data retrieval efficiency becomes low. For this reason, in such a case, a structure-change instruction signal indicating that the data structure model 131 does not reflect the KSD model 161 is outputted to the refactoring unit 172 by the structure-change determining unit 171. Upon receipt of the structure-change instruction signal, the refactoring unit 172 changes the data structure model 131 so that, as shown in the hierarchical drawing of FIG. 7, the data elements C(i) (i=1, 2, 3) are concentrated on adjacent nodes. This is a data structure operation used for making a data structure model 131 that has not been optimized with respect to the KSD model 161 closer to the optimized state. With this operation, it becomes possible to improve the data retrieval efficiency, and consequently to effectively exert the retrieval supporting function of the KSD model 161.

The above-mentioned example of the data structure change is a simplified example, and the method for changing the data structure is not intended to be limited by this method. For example, another data structure change may be proposed in which appropriate data is written by adding a new node, or in which a portion in the data that has not been structured is newly structured. Some of these specific examples will be described in Examples later; however, the data structure changing method is not intended to be limited by these Examples, and includes any method for changing the defined data structure in any format.

Data Structure

As described above, the data group 132 stored in the data store 130 and a query obtained by converting a retrieval request are provided with a specific data structure. The following description will exemplify a hierarchical data structure as an example of the data structure; however, the data structure of the present invention is not intended to be limited by this structure. For example, a data structure of a relational type or a network type may be used.

The query structure model 121 and the data structure model 131 of the present embodiment have a hierarchical data structure. The hierarchical structure is represented by a graph having each of elements on which data is written. With respect to the expression, XML (eXtended Markup Language) is used, and RDF (Resource Description Framework) is adopted as the expression format. Here, the expression means of the data structure is not intended to be limited by this method, and various expression formats capable of specifying the data structure may be utilized.

Figure 8:
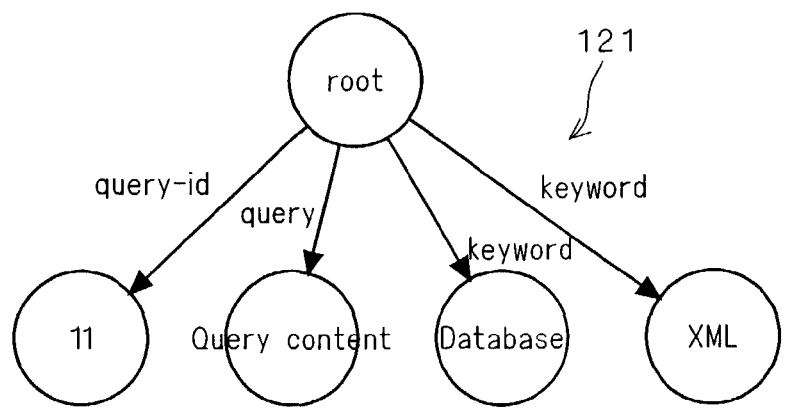
FIG. 8 shows a graph that indicates an architectural structure of a query structure model.

FIG. 8 shows a hierarchical structure of the query structural model 121 in its graph. The query structure model 121 shown in FIG. 8 exemplifies a retrieval query for a scientific article database. In this case, the query structure model 121 is provided with reserved attributes "query-id", "query" and "keyword" in root element "root". A unique natural number for identifying each query is written in "query-id". This natural number is formed upon creating a query, and is not changed. The contents of a retrieval process inputted by the user are written in "query". The keyword inputted by the user is written in "keyword". In this example, since two keywords exist, two "keyword" nodes are formed. Here, attributes other than the above-mentioned reserved attributes may be added on demand. Although FIG. 8 has exemplified a case of retrieval query in a scientific article database, the contents of the attribute may be changed in various ways in accordance with the purpose of the database.

Figure 9:
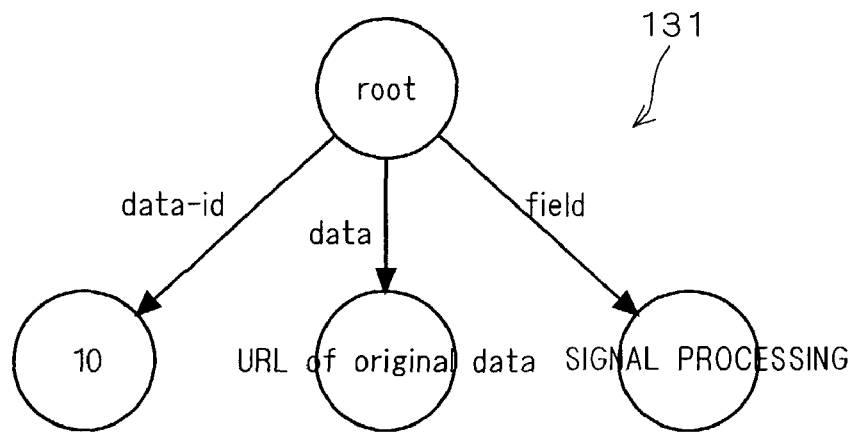
FIG. 9 shows a graph that indicates an architectural structure of a query structure model.

Next, FIG. 9 shows a hierarchical structure of the data structure model 131 in its graph. The data structure model shown in FIG. 9 is a data example of a scientific article database. In this case, the data structure model 131 is provided with reserved attributes "data-id" and "data" in root element "root". A unique natural number for identifying each data is written in "data-id". This natural number is formed upon registration in the data store 130, and is not changed. A pointer to original data is written in "data" as URL (Uniform Resource Locator). A field of each scientific article is written in "field" that is a desired attribute other than reserved attributes. Here, other attributes may be added on demand. Although FIG. 9 has exemplified a case of data structure in a scientific article database, the contents of the attribute may be changed in various ways in accordance with the purpose of the database, in the same manner as the query structure model 121.

Others

In the above-mentioned embodiment, a general description has been given of the database system in accordance with the present invention, and the following description will exemplify a specific database system. Here, all the structures described in the above-mentioned database system are not necessarily included in each of the examples. Moreover, some examples have partially modified structures. However, these are only matters of design variation that are modified in accordance with specific features of the respective database systems.

EXAMPLES OF THE INVENTION

First Example

Database System for Use in Scientific Article Retrieve

A database system 1 in accordance with a first example is a database system for use in scientific article retrieve in the medical field (hereinafter, referred to simply as "article").

1.1 Data Structure

Forming Article to XML Document;

An article to be retrieved is converted to an XML document by the translator 140, and stored in the data store 130. Schematic views of FIGS. 10 and 11 respectively show examples of an article before and after the conversion to the XML document.

Figure 10:
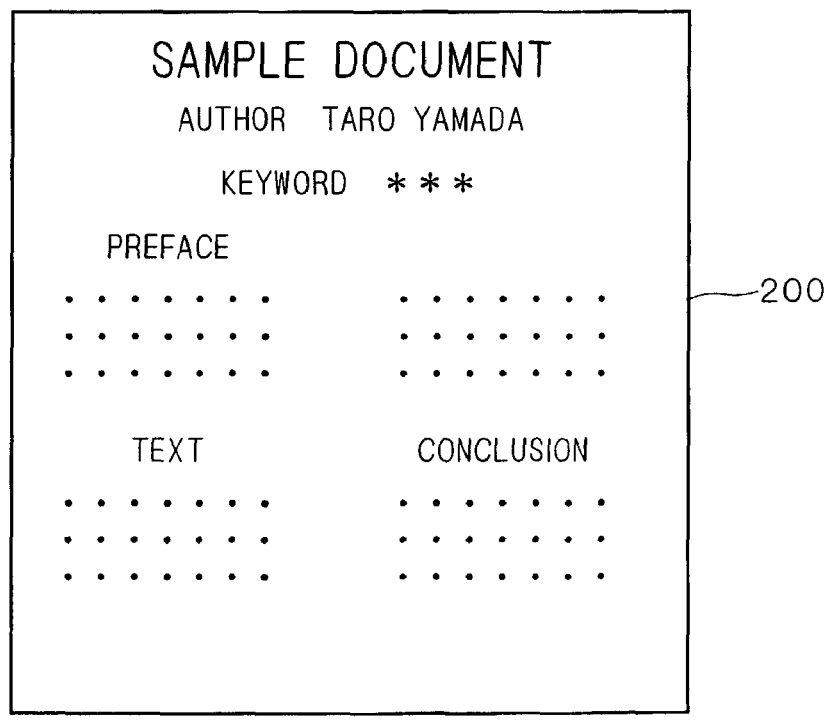
FIG. 10 shows a schematic view that indicates an article prior to conversion to an XML document.
Figures 11, 12:
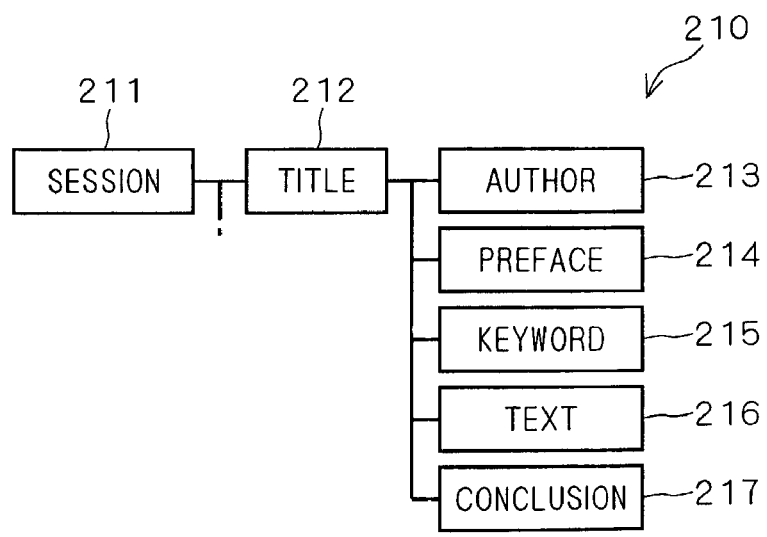
FIG. 11 shows a schematic view that indicates an article prior to conversion to an XML document.
FIG. 12 shows an architectural diagram that indicates an architectural structure of an XML document.

As shown in FIGS. 10 and 11, bibliographic items, such as "title", "author" and "keyword", of an article 200 are written in an XML document 201 as elements having the respective bibliographic items as the element names thereof. For example, "Taro Yamada", which corresponds to "author" of the article 200, is written in the element of "author" in the XML document 201. Moreover, the contents of the main body portion of the article 200 are written in the XML document 201 as elements having respective section names as element names. For example, the contents of the section "Preface" of the article 200 are written in an element "Preface" in the XML document 201.

Data Structure Model

The structure of the XML document 201, that is, the relationship between the elements of the XML document 201 is represented by RDF. In the initial state of the first example, the structure of the XML document 201 is a hierarchical data structure 210 as shown in a hierarchical drawing in FIG. 12. More specifically, session segments 211 (FIG. 12 shows only one segment; however, in fact, a plurality of segments exist), which are derived from a root segment, and indicate fields of articles 200, are installed, and title segments 212, which are derived from each session segment, are installed, and an author segment 213, a preface segment 214, a keyword segment 215, a text segment 216 and a conclusion segment 217, which are derived from each title segment, are installed. Of course, such a hierarchical structure is only one example, and another hierarchical type may be adopted. Moreover, one portion of elements may be in a non-structured state. For example, "text" may be further layered to segments such as "theory", "calculation", "experiment method" and "experiment results"; however, these may be written in "text" segment in a semi-structured state without being layered.

The above-mentioned structure is stored in the data store 130 as a data structure model 131. As will be described later, the data structure model 131 thus stored is continuously updated as the database system 1 is evolved. In other words, in the same manner as the data main body unit 132, the data structure model 131 forms an object (processing subject) of the database system 1. From this point of view, the present database system 1 is different from a conventional database system which is controlled by the data structure model and therefore has difficulty in achieving continuous evolution. With these features, the present database system 1 makes it possible to easily process semi-structured data having a data structure that has not been completely structured, and also to dynamically evolve the data structure model 131 in accordance with user's application conditions.

1.2 Database Operation

User Interface

Information input-output between the database system 1 and the user is carried out by using an user interface 110. Various types of well-known GUIs (Graphical User Interface) can be adopted as the user interface 110. The user's database operations are carried out by using a database-use application installed in a client 20. Referring to examples of display screens in GUI, the following description will discuss the database operations.

Authentication

Figure 13:
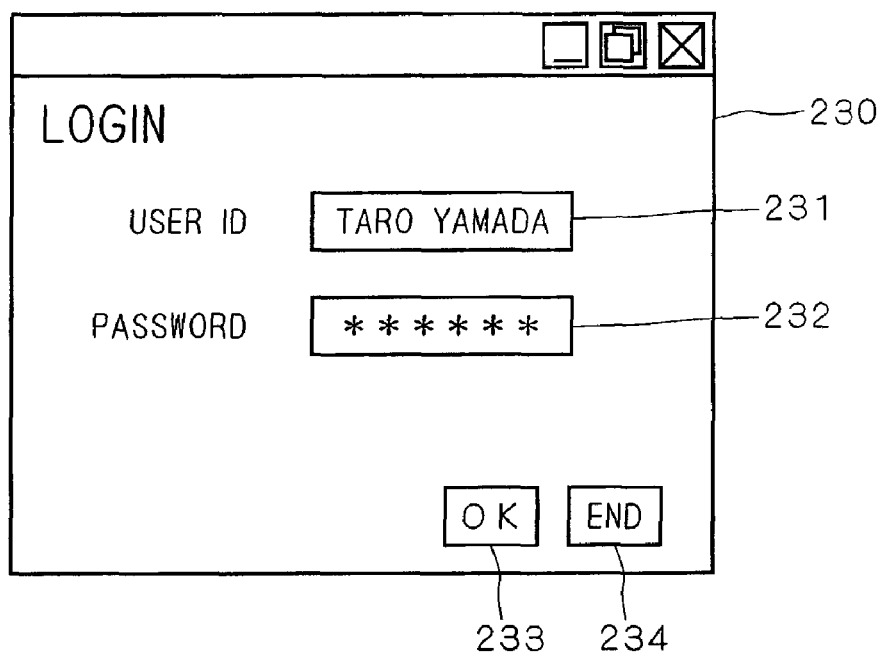
FIG. 13 shows a schematic view that indicates a login screen.

Since the database system 1 of the first example holds a KSD model 161 for each of the users, it is necessary to identify the user. Therefore, an authentication procedure is carried out before the start of the use. More specifically, as shown in FIG. 13, prior to the use of the database system 1, after having given corresponding inputs in a user ID column 231 and a password column 232 on a login screen 230, the user presses an OK button 233. When the inputted user ID and password are coincident with the user ID and password that have been preliminarily registered, the login process is completed, and the user is allowed to use the database system 1. The user can terminate the database operation by pressing a end button 234 (in the following examples of screen displays also, the end button has the same function).

Retrieval

Figure 14:
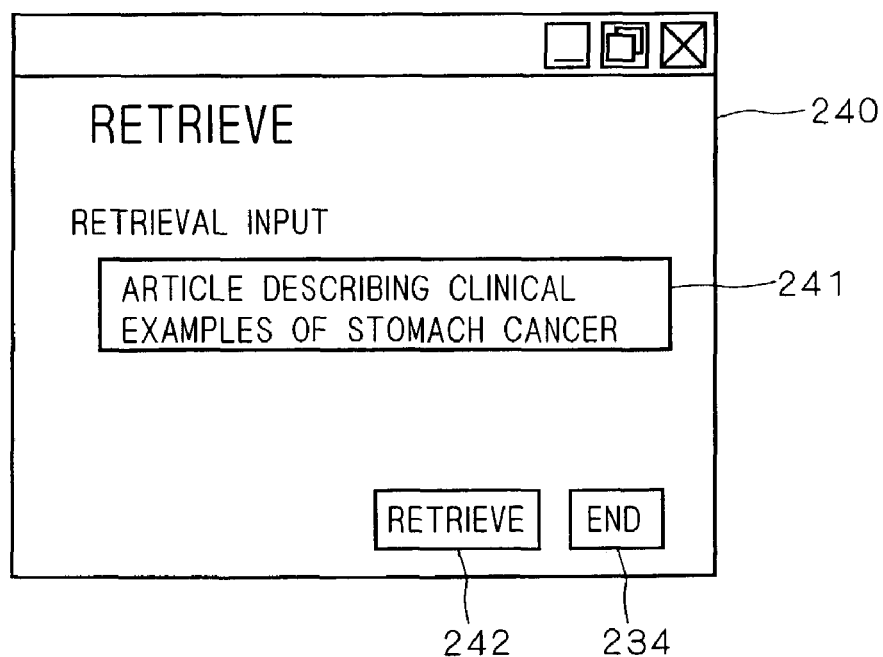
FIG. 14 shows a schematic view that indicates a retrieving screen.

In the database system 1 of the first example, it is possible to execute an article retrieving operation by inputting a natural sentence that the user uses every day. As shown in FIG. 14, the retrieving operation is carried out by inputting a natural sentence to be used for retrieval in a retrieval input column 241 of a retrieval screen 240 and pressing a retrieval button 242. For example, in an attempt to examine clinical examples for the stomach cancer, the user inputs "articles in which clinical examples for the stomach cancer are described" into the retrieval input column 241.

Display of Retrieval Results

Figure 15:
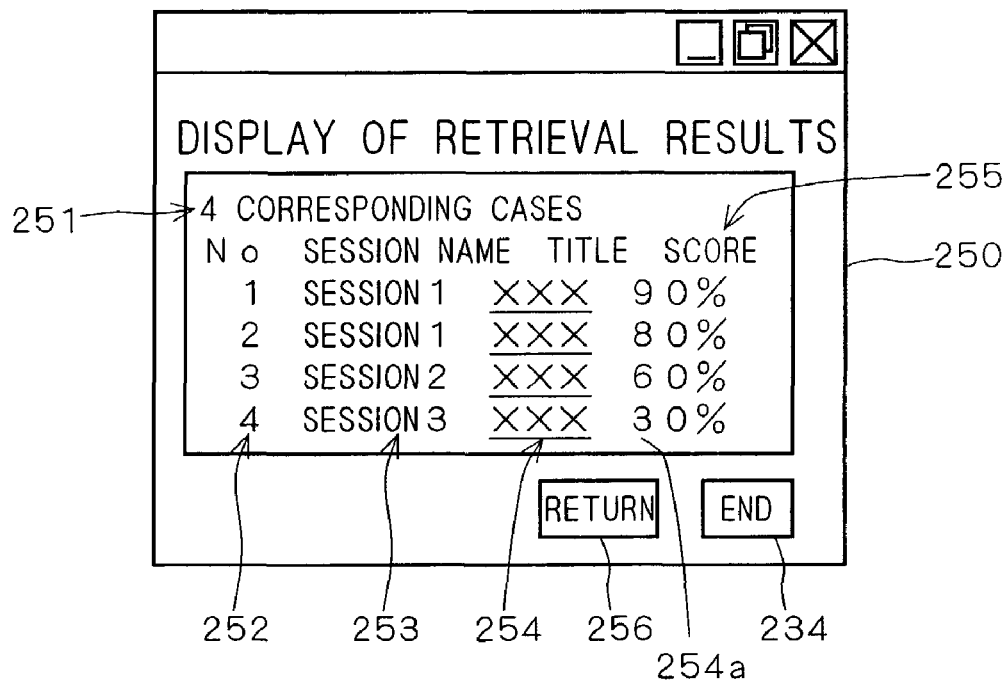
FIG. 15 shows a schematic view that indicates a retrieving result display screen.

FIG. 15 shows a retrieval-result display screen 250 of the database system 1 of the first example. The retrieval results include the corresponding number of cases 251 that indicate the number of outputted articles, NO 252 that indicates the order of outputs, session names 253 of the outputted articles, titles 254 thereof, and a score 255 that is a parameter that indicates the degree of relationship with the retrieval input that is estimated by the database system 1. Here, the score 255 takes a numeric value within a range from 0% to 100%; thus, the greater the numeric value, the stronger the relationship with the retrieval input. Here, the output order of the articles is represented by the descending order of the score 255.

Here, an underline 254*a* is put below the title 254 of each displayed article, thereby indicating that a link to the detailed information is provided. The user clicks a mouse button with the mouse pointer being matched with the underline 254*a* so that he or she is allowed to view a detailed display screen 260 that will be discussed next. Moreover, by pressing a return button 256, the user is allowed to make the retrieval screen 240 again displayed.

Detailed Display

Figure 16:
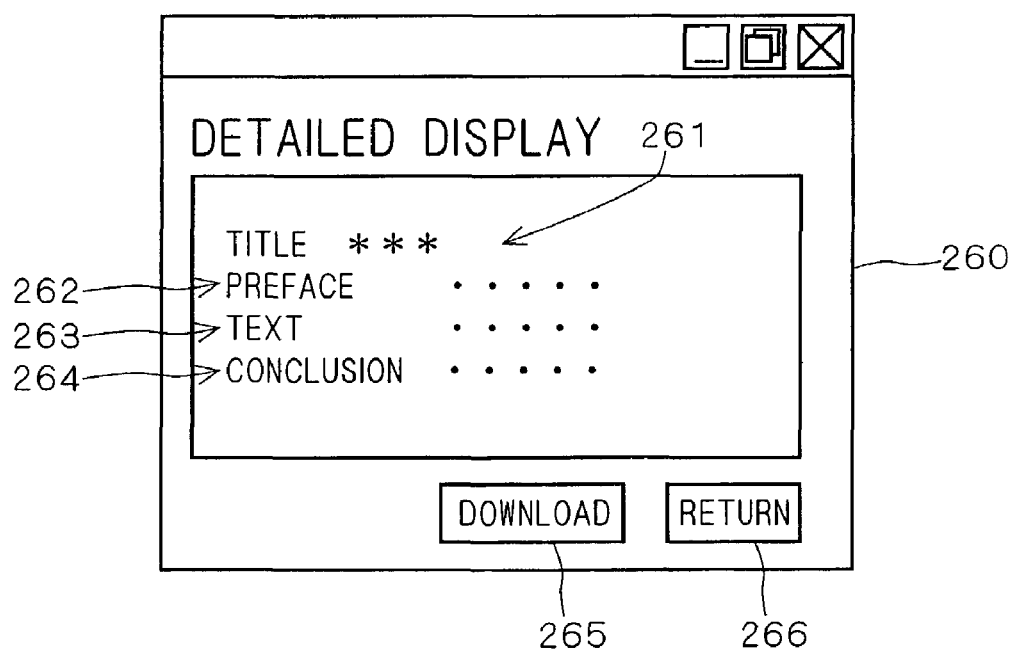
FIG. 16 shows a schematic view that indicates a detailed display screen.

FIG. 16 shows the above-mentioned detailed display screen 260. The detailed display screen 260 displays the article selected in the retrieval-result display screen 250 in detail. More specifically, in addition to title 261, preface 262, text 263 and conclusion 264 are displayed. By pressing a download button 265, the user is allowed to download the corresponding article in a predetermined file format, and to view, print and carry out other operations. Moreover, by pressing a return button 266, the user is allowed to make the retrieval-result display screen 250 again displayed, and to select another detailed article.

1.3 Query

Optimization of Retrieval Processes

Figure 17:
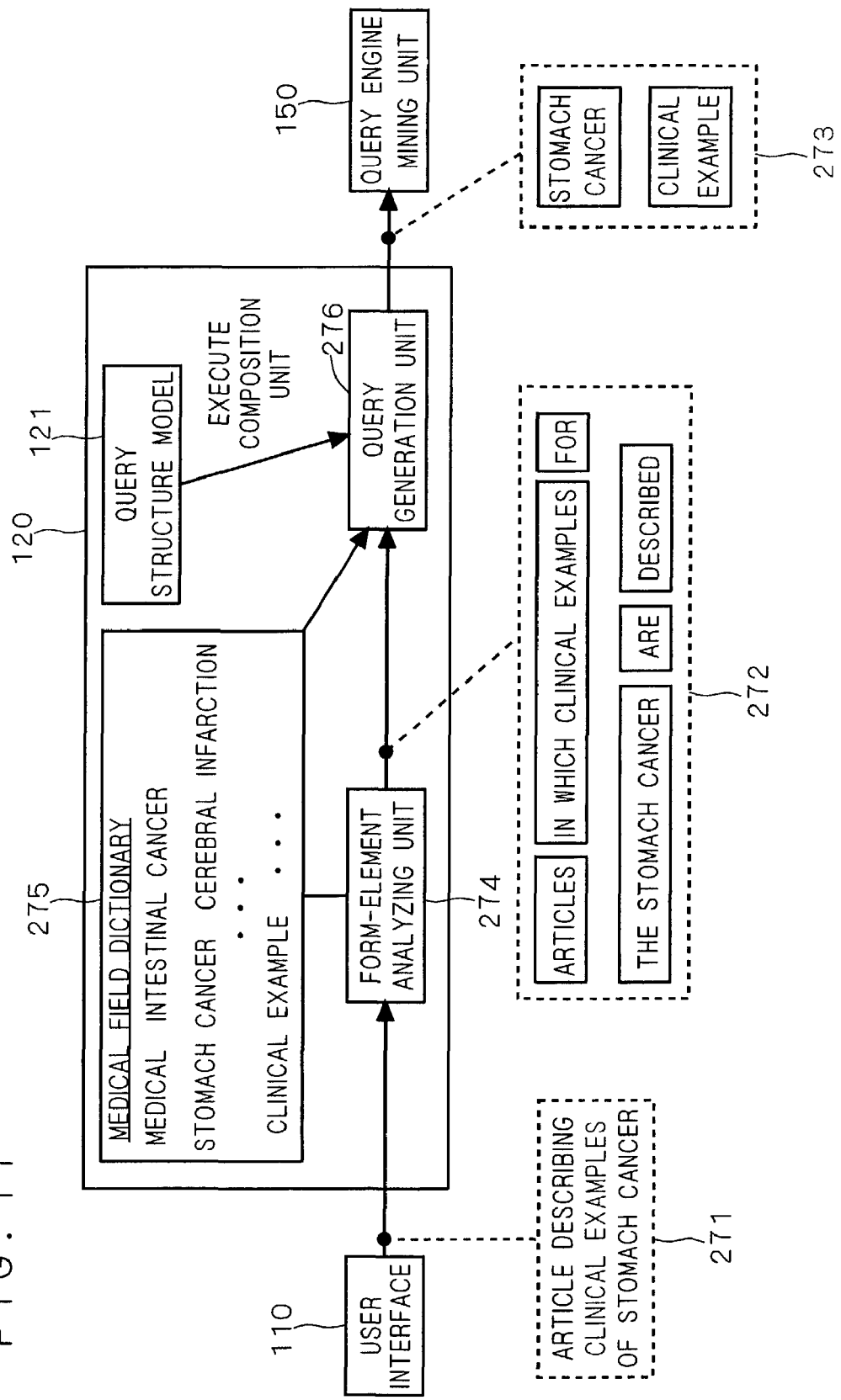
FIG. 17 shows a block diagram that describes functions of an execute composition unit.

The retrieval sentence inputted by the user is analyzed by the execute composition unit 120, and converted to such a query as to provide optimal retrieving processes in the query engine mining unit 150. FIG. 17 is a block diagram that describes functions of the execute composition unit 120 in accordance with the first example. By exemplifying a case in which a natural sentence 271, "articles in which clinical examples for the stomach cancer are described", is inputted for a retrieving operation, the following description will discuss the execute composition unit 120 in detail by reference to FIG. 17.

First, the natural sentence 271, "articles in which clinical examples for the stomach cancer are described" inputted from the user interface 280, is decomposed into clauses by a form-element analyzing unit 274. That is, it is decomposed into 7 clauses 272, "articles", "in which clinical examples", "for", "the stomach cancer" "are" and "described". The retrieval input, decomposed into the clauses 272, is outputted to a query generation unit 276. Referring to a medical-field dictionary 275 including technical terms used in the medical field, the query generation unit 276 extracts only the technical terms from the inputted clauses. In this case, two technical terms 273, that is, "stomach cancer" and "clinical examples", are extracted. Moreover, referring to the query structure model 121, the query generation unit 276 converts the extracted technical terms 273 to a format that is in conformity with the query structure model 121, and outputs the resulting data to the query engine mining unit 150.

Here, the execute composition unit 120 may be provided with a function that eliminate the polysemy of the retrieval inputs so that even upon receipt of synonyms, such as "stomach cancer (written in Japanese Hiragana)" and "stomach cancer (written in Japanese Katakana)", the same retrieval output is obtained.

Retrieval Process and Retrieval Result Output

By using the query inputted from the execute composition unit 120, the query engine mining unit 150 extracts articles containing the queries "stomach cancer" and "clinical examples" from the data store 130 through full text retrieval processes. The articles thus extracted are outputted to the execute composition unit 120. The outputted articles are displayed on the aforementioned retrieval-result display screen 250. Here, the score 255 of the retrieval-result display screen 250 is given by an extended function of the database system 1 of the first example, and the detailed description thereof will be given in Section for describing extension functions.

1.4 Construction of KSD Model

Various modes are proposed in forming the KSD model 161, and referring to the following example, a description will be given in this section. In this mode, it is supposed that the relationship between a keyword of a query generated from the user's retrieval input (hereinafter, referred to simply as "user keyword") and a keyword that the author has given to the article downloaded by the user (hereinafter, referred to simply as "primary keyword") is learned by a neural network, and accumulated as a KSD model 161. In this case, "the user keyword" which is obtained by a sequence of database operations by the user and "the primary keyword" are outputted from the execute composition unit 120 to the realization store 160, and utilized for the formation of the KSD model 161.

In the present example, the user keyword and the primary keyword respectively correspond to the condition A and the result B described in the embodiment of the invention. In this case, in principle, all the technical terms described in the medical field dictionary 275 can be the condition A, and all the primary keywords given to all the articles stored in the data store 130 can be the result B. For convenience of description, referring to a simple neural network in which only three terms of "stomach cancer", "clinical examples" and "broken bone" are included in the medical field dictionary 275 with only three words of "anti-cancer drug", "metastasis" and "cast" being included as the primary keywords, the following description will describe the case.

Figure 18:
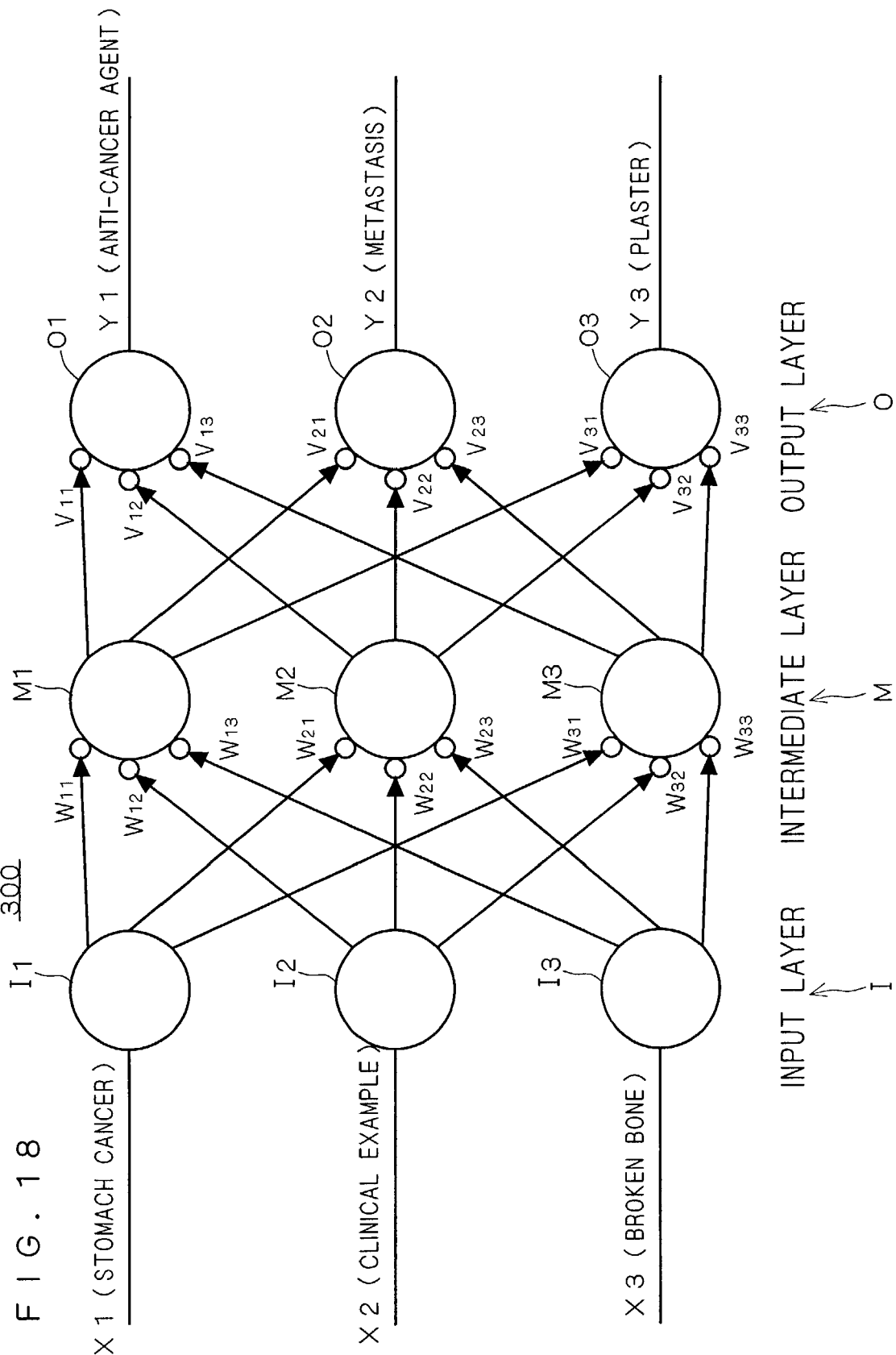
FIG. 18 shows a schematic view that describes a neural network.

FIG. 18 shows a schematic view of a neural network 300 of the first example. The neural network 300 is a perceptron constituted by an input layer I, an intermediate layer M and an output layer O, each of which has three neurons. Here, the respective words, "stomach cancer", "clinical examples" and "broken bone" are made in association with inputs X1, X2 and X3 respectively. Each of the inputs X1, X2 and X3 is allowed to have a value "0" or "1" so that the word included in the user keyword is represented by "1", while the word that is not included therein is represented by "0". In other words, in the case when "stomach cancer" and "clinical examples" are included in a user keyword, the input is represented by (X1, X2, X3)=(1, 1, 0). In the same manner, the respective words, "anti-cancer drug", "metastasis" and "cast" are made in association with outputs Y1, Y2 and Y3. Each of the output Y1, Y2 and Y3 is allowed to have a value "0" or "1" so that the word included in the primary keyword is represented by "1", while the word that is not included therein is represented by "0". In other words, in the case when "anti-cancer agent" and "metastasis" are included in the primary keyword, the input is represented by (Y1, Y2, Y3)=(1, 1, 0).

The inputs (X1, X2, X3) are respectively inputted to neurons I1, I2, I3 of the input layer. Moreover, the respective outputs of the neurons I1, I2, I3 are all inputted to the neurons M1, M2, M3 of the intermediate layer. Successively, the respective output of the neurons M1, M2, M3 are all inputted to neurons O1, O2, O3 of the output layer. The outputs of the neurons O1, O2, O3 respectively form the outputs Y1, Y2, Y3.

Figure 19:
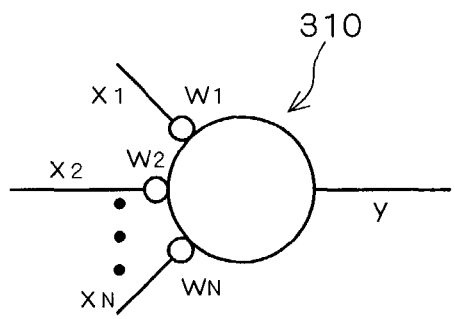
FIG. 19 shows a schematic view that describes a neuron.

Here, the neuron will be described below. As shown in FIG. 19, in general, a neuron 310 can determine an output y in response to inputs $x_1, x_2, \ldots, x_N$ (in this example N=3). With respect to the inputs $x_1, x_2, \ldots, x_N$, combined weights $w_1, w_2, \ldots, w_N$ that are weights of the respective inputs are determined. When inputs are given to the neuron 310, the output y is determined by a net value u (equation 1) and a combination function F (equation 2) which are calculated from the inputs $x_1, x_2, \ldots, x_N$, and the combined weights $w_1, w_2, \ldots, w_N$.

$$u = \sum_{i=1}^{N} w_i x_i$$ Equation 1

$$F(u) = \begin{cases} 0 & (u \le \theta) \\ 1 & (u > \theta) \end{cases}$$ Equation 2

Here, θ in equation 2 is a threshold value of the combination function F. That is, this equation indicates that when the net value u exceeds the threshold value θ, the output changes from "0" to "1". Here, the above-mentioned combination weights $w_1, w_2, \ldots, w_N$ are changed by learning processes of the neural network 300. Moreover, the above-mentioned combination function F is only one example, and can be changed in various ways depending on features of the database system.

Figure 20:
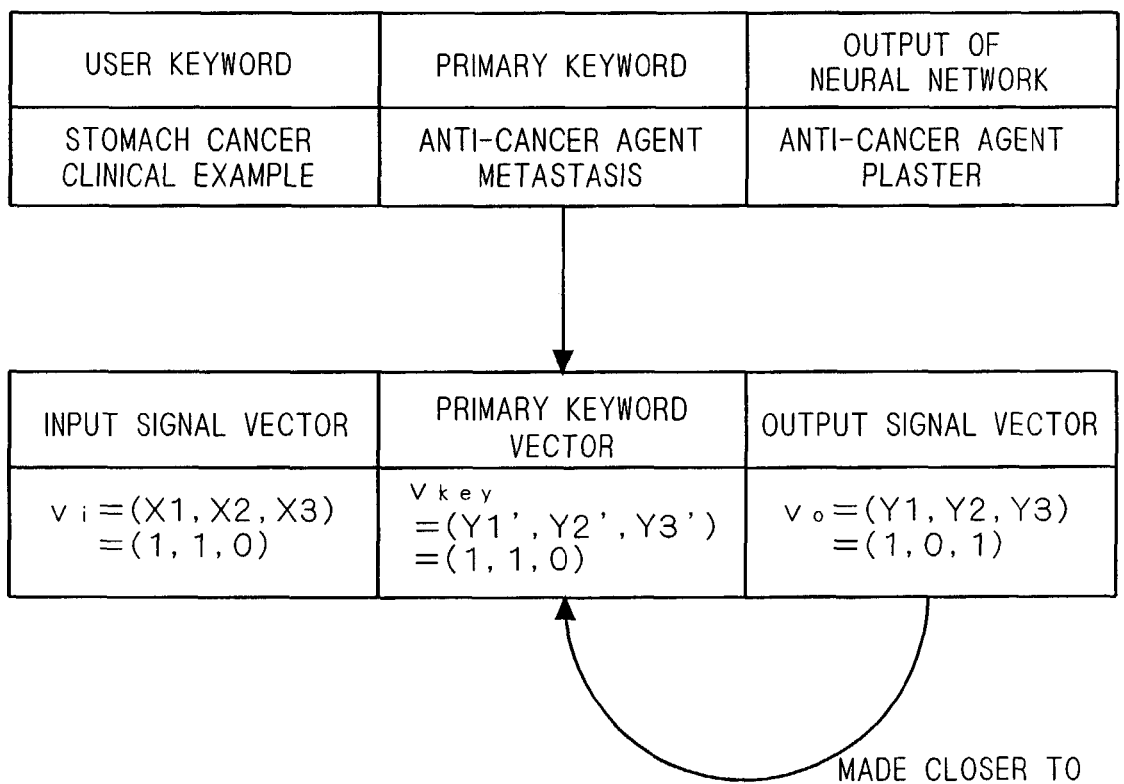
FIG. 20 shows a drawing that describes a process in which a combined weight in the neuron is changed.

Next, learning processes of the neural network 300 will be described. The neural network 300 carries out learning processes by using a primary keyword that the realization store 160 obtained from the execute composition unit 120 as a teaching signal with respect to the corresponding user keyword. In other words, in the neural network 300, processes for changing the combination weight of the neuron are carried out so as to make the output signal vector $v_o$=(Y1, Y2, Y3)=(1, 0, 1) of the neural network 300 with respect to the input signal vector $v_i$=(X1, X2, X3)=(1, 1, 0) closer to the primary keyword vector $v_{key}$=(Y1', Y2', Y3')=(1, 1, 0) (FIG. 20 shows these relationships as a list). The learning processes are carried out on the basis of, for example, the standard delta rule. More specifically, when the combination weight prior to learning from neuron $M_j$ to neuron $O_i$ is represented by $V_{ij}$, $V_{ij}'$ determined by equation 3 is adopted as a new combination weight from neuron $M_j$ to neuron $O_i$; thus, the learning processes are carried out on the neural network 300.

$$V'_{ij} = V_{ij} + \epsilon(Y'_i - Y_i)a_j$$ Equation 3

Here, $\epsilon$ is a positive real number, and forms a parameter indicating the degree of contribution in the latest learning, and $a_j$ is an output from the neuron $M_j$.

As clearly shown by equation 3, in the case when the teaching signal and the output signal are equal to each other, no change occurs in the combination weight, with the result that no learning process is carried out. In response to an output, when the output signal of the neuron is "0" with the teaching signal being set to "1", the combination weight is increased so as to make the output of the neuron greater. In contrast, in response to an output, when the output signal of the neuron is "1" with the teaching signal being set to "0", the combination weight is degreased so as to make the output of the neuron smaller. With these arrangements, the combination weight is changed so as to make the output signal to a specific input signal closer to the teaching signal.

Here, in the above-mentioned learning process, there is no change in the combination weight of the intermediate layer M; however, in an actual database system, the combination weight of the intermediate layer M may be changed on the basis of a high-degree learning rule such as back propagation.

By repeating these learning processes (that is, as the user repeats the retrieval inputs and downloads), it becomes possible to further improve the degree of approximation of mapping in the realization store 160 from conditions (user keyword) to the result (primary keyword). As the degree of approximation is improved, the realization store 160 makes it possible to more accurately estimate the primary keyword contained in the article that is required for the user, in the case when the user gives a new retrieval input so as to carry out database operations. This improvement in the estimating capability is advantageous in providing various useful functions such as the alteration in the database structure and the extension functions of the database structure, which will be described in the next section and thereafter.

Moreover, even when the tendency of the user's retrieval input and articles to be downloaded changes as time elapses (for example, as the user becomes a college student→graduate student→professor, he or she often comes to retrieve articles relating to serious diseases, starting from articles relating to commonplace sicknesses), the KSD model 161 is allowed to change in response to such changes; thus, it becomes possible to properly maintain the usefulness of the database system 1 for the user.

1.5 Evolution of Data Structure Model

In the first example, referring to an example in which the data structure model 31 changes every time the KSD model 161 carries out an additional learning process. In other words, in this example, as the data-estimating capability of the KSD model 161 improves, the data structure model 131 changes in parallel with each other.

Structure Change Determination

When user keywords and a primary keyword have been determined in a sequence of database operations by the user, the structure change determining unit 171 determines whether or not the primary keyword is reflected to the user keywords. More specifically, in the case when all the user keywords are included in the primary keyword, it is determined that the primary keyword is reflected to the user keywords, while, in the case when there is a user keyword that is not included in the primary keyword, it is determined that the primary keyword is not reflected to the user keyword.

Structure Change Process

Figure 21:
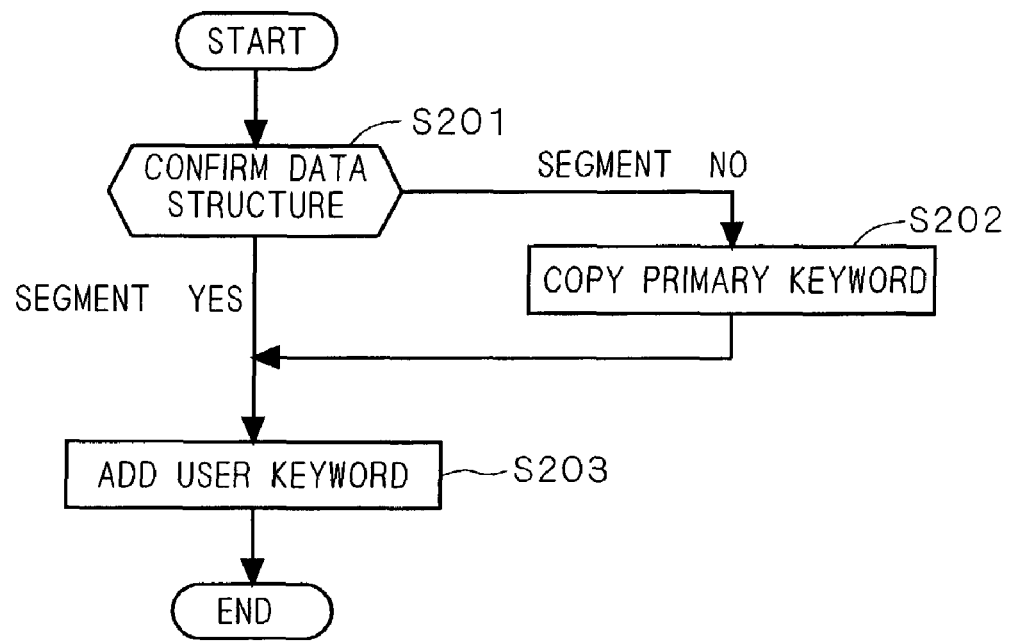
FIG. 21 shows a flowchart that describes a structure alteration process.

When the structure change determining unit 171 has determined that the primary keyword is not reflected to the user keywords, a structure change instruction signal is outputted from the structure change determining unit 171 to the refactoring unit 172. Upon receipt of the structure change instruction signal, the refactoring unit 172 executes a structure changing process (reconstruction of data structure). Referring to a flowchart in FIG. 21, the structure changing process will be described.

Figure 22:
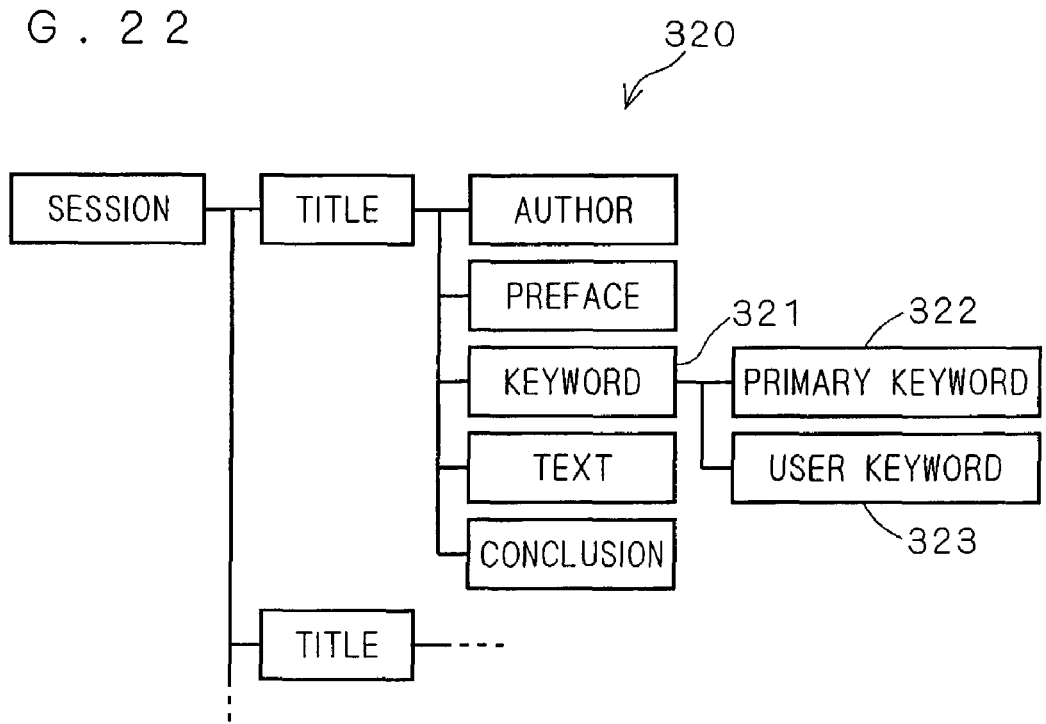
FIG. 22 shows an architectural diagram that indicates an architectural structure of a data structure.

First, at step S201, the data structure model 131 at the current time is confirmed so that a branching process is carried out. In other words, the refactoring unit 172 confirms whether or not a primary keyword segment 322 and a user keyword segment 323 (see data structure 320 shown in the hierarchical drawing in FIG. 22) exist in a lower layer of a keyword segment 215 of the corresponding article. In the case when these segments exist, the sequence proceeds to step S203. When these segments do not exist, the sequence proceeds to step S202.

At step S202, a primary keyword segment 322 and a user keyword segment 323 are newly formed in the lower layer of the keyword segment 321. Further, keywords described in the keyword segment 215 of the data structure 210 are copied, and written in the primary keyword segment 322. Upon completion of these processes, the sequence proceeds to step S203.

At step S203, the keyword among the user keywords, which is not included in the primary keyword is added to the user keyword segment 323, thereby completing the structure change process at this time.

Through the above-mentioned structure changing process, the user keywords other than keywords that have been given to the article by the author are added thereto.

Since the retrieval process is carried out through the full text retrieve, the additional user keyword is a technical term that has been contained in any portion of the article. In other words, by using a technical term contained in the article although the author of the article has not preliminarily expected, the corresponding article can be extracted by the user.

In the database system 1 of the first example, the user keywords, added in this manner, are dealt in the database operations thereafter as a keyword equivalent to the primary keyword. In other words, in the database operation thereafter, the primary keyword, which forms a teaching signal of the neural network 300, is dealt in a manner so as to also include "stomach cancer" and "anti-cancer agent". Thus, the learning process is carried out in such a manner that the keywords used by the user (more specifically, technical terms contained in a natural sentence included in the user's retrieval input) are added as keywords that represent the features of the article and that the output of the neural network 300 is also made to have a stronger tendency to output such keywords. Here, since such a structure-changing process is executed each time a new retrieval process is carried out, as the database system 1 is utilized more frequently, the user is allowed to carry out retrieval processes for required articles more easily. This easiness has an accumulating property, and it is difficult for a conventional database system to achieve this property.

By using the above-mentioned structure-changing process, the data structure 210 is allowed to have a structure that corresponds to the logical models 6 to be accumulated in the KSD model 161. Thus, it becomes possible to further accelerate the database evolution by the realization store 160. Consequently, the application of such a structure-changing process makes it possible to improve the access efficiency to the data group 132 in the database system 1, and consequently to firmly assist the database operations by the user.

1.6 Extension Functions

The database system 1 of the present example makes it possible to provide various extension functions other than the retrieval function to the user by utilizing the KSD model 161. This section describes specific examples of such extension functions.

Display Sequence of Retrieval Results

Figure 23:
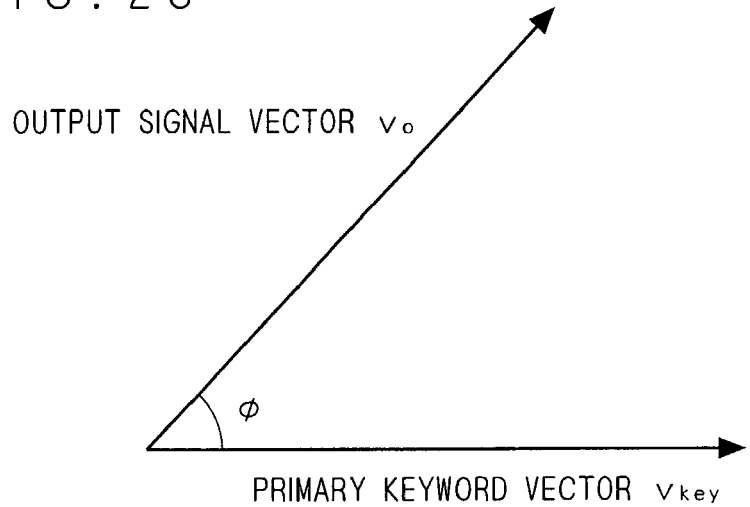
FIG. 23 shows a drawing that indicates a primary keyword vector and an output signal vector in an article.

As described in the retrieval-result display screen 250 (FIG. 15), scores 255 are added to the retrieval results, and the outputted articles are displayed in a descending order of the scores 255. Each of these scores 255 is given as an amount that has a positive correlation to a cosine $\cos \phi$ (see FIG. 23) of an angle $\phi$ that is made by the primary keyword vector $v_{key}$ of the corresponding article and the output signal vector $v_o$. In other words, the execute composition unit 120 is arranged so that as the value $\phi$ becomes smaller, the calculated score 255 becomes higher. Since the output signal vector $v_o$ is a keyword contained in the necessary article estimated by the realization store 160, the article actually containing the corresponding keyword as the primary keyword is allowed to have a higher score 255, and displayed on an upper level in the retrieval results.

Moreover, since, as the retrieval input is repeated more frequently, the estimating capability of the realization store 160 is further improved, the output score 255 is changed to a more appropriate value. Thus, the user is allowed to retrieve necessary articles more efficiently.

Guidance to Non-Skilled User

The database system 1 of the first example can provide guidance to a non-skillful user by utilizing the KSD model 161. The following description will discuss an example in which guidance for better retrieval processes is given to a non-skillful user who gives abstract retrieval inputs that are almost useless for the query engine mining unit 150 to focus the article.

Figure 24:
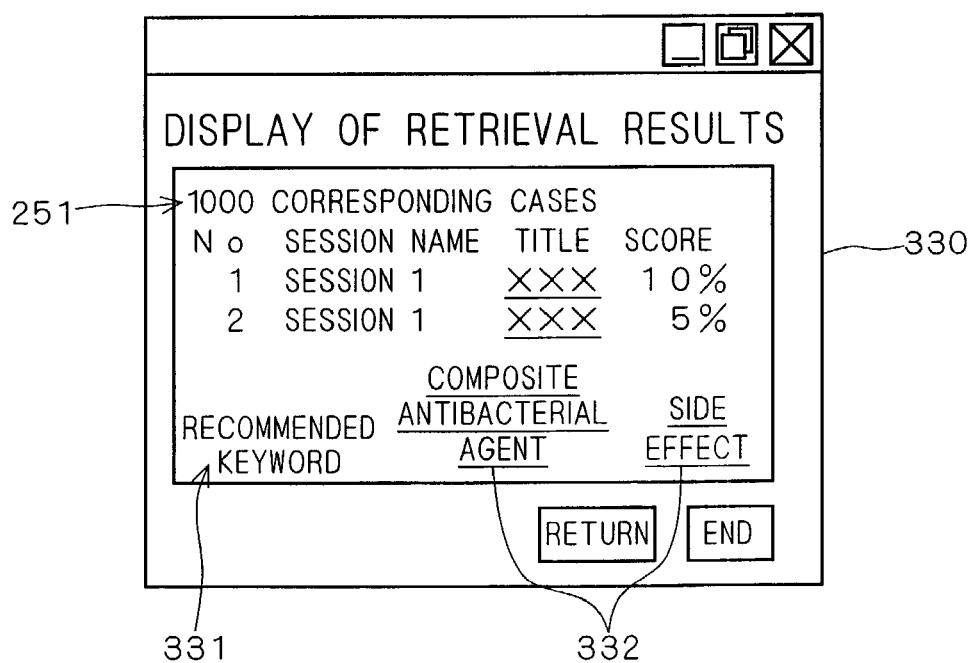
FIG. 24 shows a schematic view that indicates a retrieval result display screen.

For example, suppose that a non-skillful user makes a retrieval input, "medicine", that is, an abstract retrieval input. In this case, as shown in a retrieval-result display screen 330 of FIG. 24, a number of retrieval results are outputted; however, the scores of the outputted articles are extremely low, with the result that no useful information is obtained. This is because the technical term "medicine" is used in a number of articles, and because there are only few primary keywords that are strongly combined on the neural network 300, that is, this word is weakly combined with many primary keywords. In such a case, primary keywords, which correspond to the neuron of the output layer O that provides a comparatively greater net value u when the input "medicine" is inputted, is outputted on the retrieval-result display screen 330 as a recommended keyword 331. FIG. 24 shows an example in which "composite antibacterial agent" and "side effect" are displayed as recommended keyword 331. In other words, even in the case when "medicine", that is, an abstract keyword, is inputted, since learning processes indicating that a group of users that use this database also require articles relating to "composite antibacterial agent" and "side effect" have been carried out on the neural network 300 through analyses of a number of retrieval processes previously carried out, the recommended keywords 331 that are specified by the results of the learning processes are given to the user. These recommended keywords 331 are provided with underlines 332 that indicate detailed links; thus, by carrying out the operation of GUI in the same method as described with respect to the title 254, automatic retrieving processes are carried out by clicking these keywords.

Export and Import of KSD Models

Since the above-mentioned KSD model 161 is separated from the data group 132 stored in the data store 130, it is exportable to another database system (hereinafter, referred to as "homogeneous database") having the same structure as this database system 1. For example, the KSD model 161 in the database system 1 for use in scientific article retrieval in the medical field may be exported to a database system for use in scientific article retrieval in the medicine manufacturing field so as to be used as a KSD model therein. The exporting process is carried out by, for example, writing combined weights in a file having a predetermined format so as to be copied in a different database system.

Since these database systems have mutually similar functional structures, the reversed operations for importing the KSD model of the database system for use in retrieval of scientific articles in the medicine manufacturing field to the database system for use in retrieval of scientific articles in the medical field can be carried out by the same method.

With this arrangement, even in the case when a new database system is created, it is not necessary for the KSD model to carry out learning processes from the initial stage; therefore, it is possible to use a KSD model that has been subjected to learning processes to a high degree immediately after the start of the use of a new database system. Moreover, even in the case when the number of the users is small with the result that it is difficult to make learning processes of the KSD model properly progress, the user's retrieving operations can be firmly supported by importing the KSD model that has been subjected to learning processes to a high degree.

Figure 3:
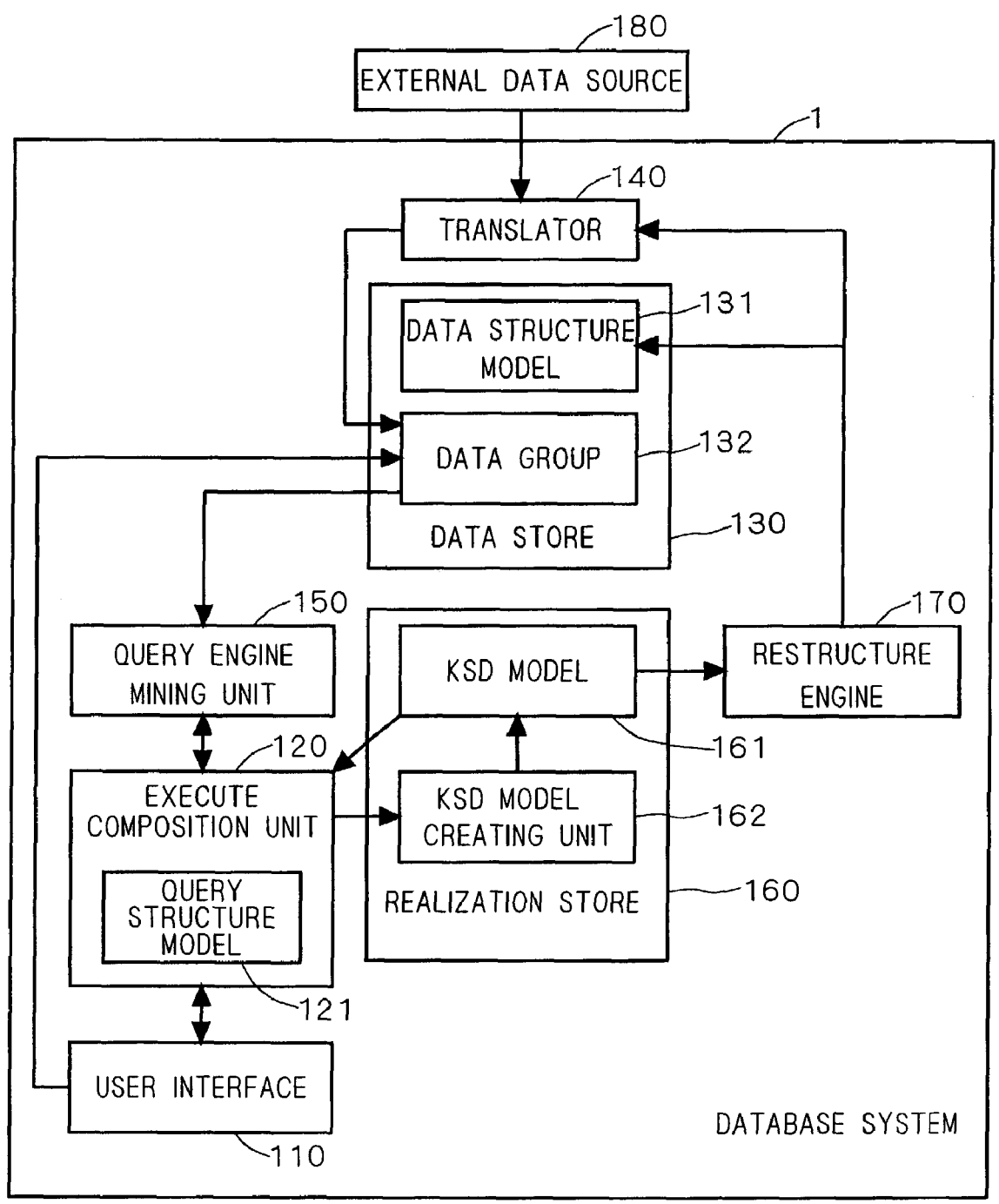
FIG. 3 shows a block diagram that describes a relationship between sub-systems of the database system.

In other words, the KSD model 161 of FIG. 3 corresponding to the logical model 6 of FIG. 1 is constricted in a manner so as to be separated from the contents of the data store 130 and evolved so that the KSD model 161 (logical model 6) can be compatibly used among a plurality of database systems with importing and exporting processes of the logical model 6 being available among the databases. In other words, the logical model 6 (KSD model 161) is allowed to have a self-completing property that is independent from the contents of data accumulation inherent to the respective databases; therefore, it is possible to carry out transferring processes among a plurality of databases.

Combination of KSD Models

Moreover, in the first example, the KSD model 161 is installed for each user; however, KSD models of a plurality of users may be combined to create a new KSD model.

In other words, in the case when a plurality of users and a plurality of databases exist, the following four types of logical models may be applied thereto:

(1) A logical model (hereinafter, referred to as "database versatile logical model") that can be commonly used in a plurality of databases, although it is inherently used by each user;

(2) A logical model (hereinafter, referred to as "user versatile logical model") that can be commonly used by a plurality of users, although it is inherent to each database;

(3) A logical model (hereinafter, referred to as "entirely versatile logical model") that is commonly used in any combination between any user and any database; and (4) A logical model (hereinafter, referred to as "inherent logical model") that is different from each other for each combination between users and databases).

The above-mentioned logical model 6, which is transferred between the database for use in retrieval of scientific articles in the respective medical and medicine manufacturing fields, corresponds to "the database versatile logical model" of the above-mentioned four types. This model has a mode that is formed on the basis of the principle that, since the logical model of each of individual users is a "person-related" model to which the user's characteristics and capabilities (in the case of a user group, characteristics of the group) are reflected, the corresponding logical model is applicable to other same types of data with respect to the user.

In contrast, "the user versatile logical model" of the above-mentioned four types makes it possible to construct a high level logical model that is commonly used by respective users, by combining logical models of the respective users with respect to the same database. For example, by combining KSD models 161 of users U and V (for example, both are surgeons of cardiovascular system) who have a similar article-retrieving tendency, it is possible to achieve such an evolution.

In this case, suppose that the combination weights of the users U and V are $W_U$, $W_V$, respectively. Moreover, suppose that the frequencies of use of the databases of the users U and V are respectively represented by $P_U$, $P_V$ ($P_U+P_V=1$). The sum of weights ($P_U W_U + P_V W_V$) of the combination weights $W_U$ and $W_V$ with the frequencies $P_U$, $P_V$ being used as weights is calculated as a new combined weight, and the KSD model 161 (logical model 6) containing the new combined weight is used as a common logical model for the users U and V. Thus, it is possible to use a KSD model 161 that has been subjected to higher-level progressed learning processes than the KSD model 161 that has been individually evolved with respect to each of the users, thereby making it possible to improve the retrieval efficiency for each user.

1.7 Modification

Figure 25:
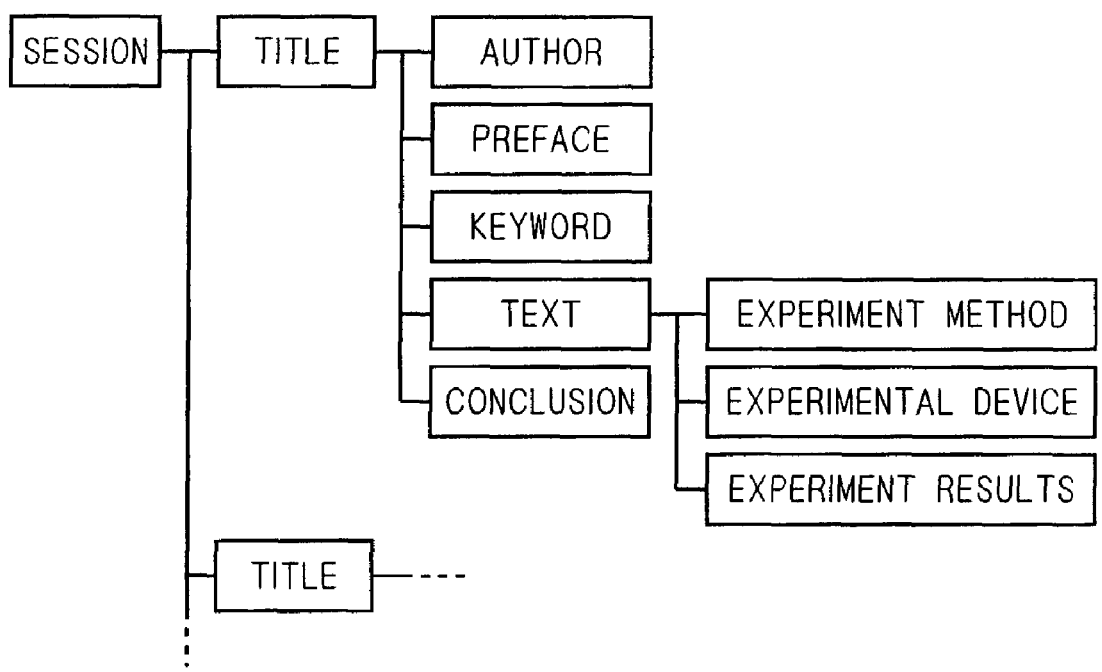
FIG. 25 shows an architectural diagram that indicates an architectural structure of an XML document.

In the above-mentioned first example, a logical model located between the user keyword and the primary keyword is specified by a neural network and held therein, and utilized for a data structure change; however, in addition to these, various modes may be proposed with respect to the KSD model 161. For example, the number of user keywords contained is accumulated and stored with respect to each of sections, and a section having a great number of accumulated and stored keywords may be structured. For example, as shown in a hierarchical drawing in FIG. 25, it is proposed that, in a sub-section of the text that has not been structured, those of "experimental methods", "experimental results" and "experimental devices", which have a great number of accumulated and stored user keywords may be newly structured. In the case when such structure changes are carried out, the translator 140 is also updated simultaneously so that a newly added article is preliminarily made to be in conformity with such a data structure model 131.

Second Example

School Education Teaching Material Database System

The database system 1 of the second example is constructed as a database system which manages school education teaching materials (hereinafter, referred to simply as "teaching material"). This database system 1, in particular, determines an optimized teaching material for each student on the basis of inputted educational achievements so that it is used for assisting the selection of a teaching material to be used when a teacher teaches the student. The following description will discuss the database system 1; however, with respect to those points that are the same as those of the first example, the detailed description thereof will not be repeated.

2.1 Data Structure

In the data store 130 of the database system 1 of the second example, teaching material data, educational achievement data, student characteristics data and a data structure model 131 thereof are stored.

Teaching Material Data

Figure 26:
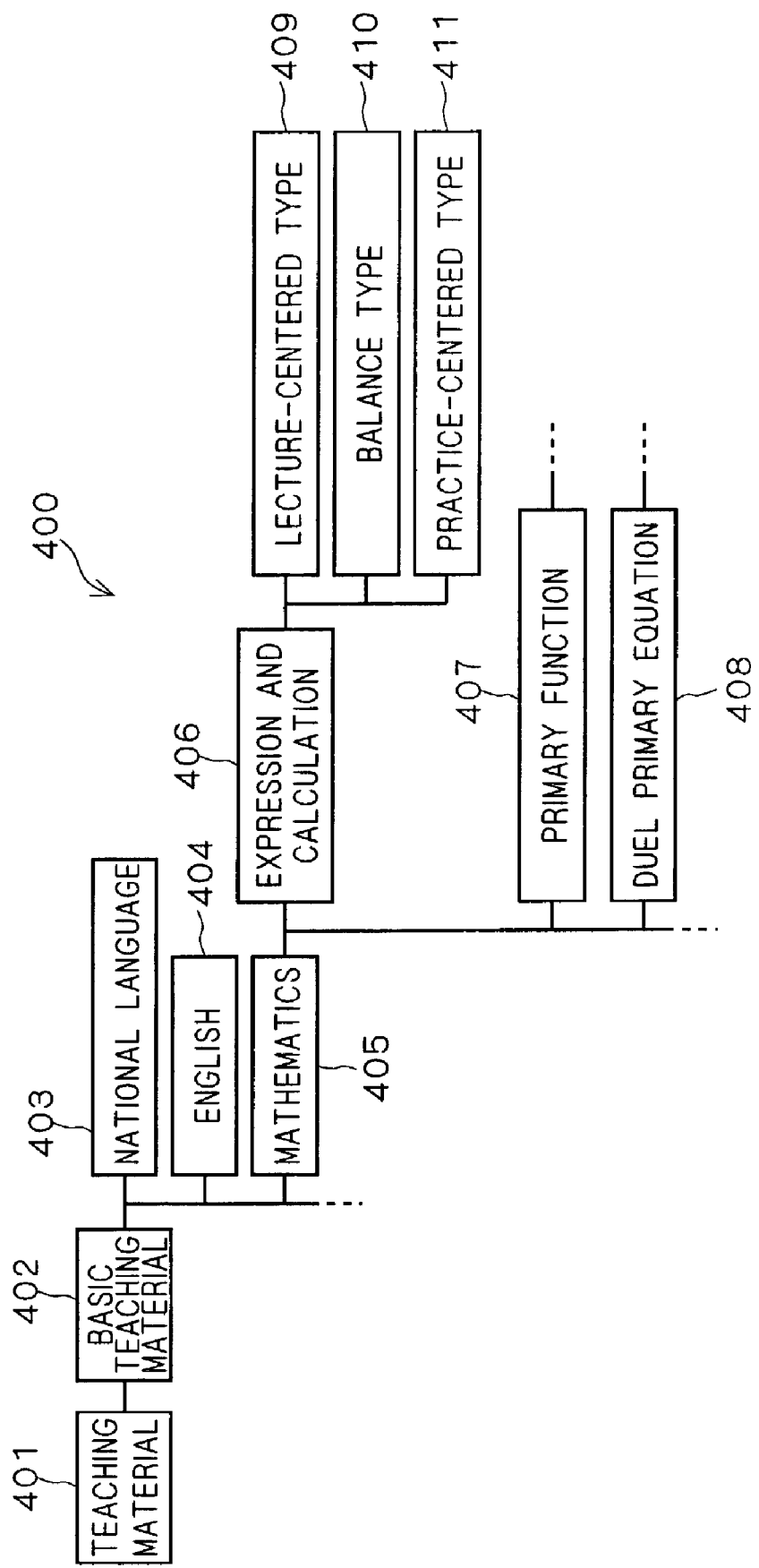
FIG. 26 shows an architectural diagram that indicates an architectural structure of teaching data.

Teaching material data is also written as XML documents in the same manner as the article 200 in the first example. The XML documents include the contents of a teaching material to be used for instruction that are classified on the basis of subjects, units and teaching methods. FIG. 26 shows a hierarchical drawing of a data structure 400 of the document contents. In other words, basic teaching material segment 402 that is derived from a teaching material segment 401 and represents a general-use teaching material is installed, subject segments 403 to 405 derived from the basic teaching material segment 402 are installed, unit segments 406 to 408 derived from each of the subject segments are installed, and teaching material segments 409 to 411, such as a lecture-centered type, a balance type and a practice-centered type, that are derived from each of the unit segments are installed. The teaching material segments 409 to 411 include specific contents of the teaching materials, cautions upon teaching by the use of the teaching material and samples of examinations. In other words, a plurality of teaching materials to which teachers make reference are written. Here, those teaching materials of the lecture-centered type and the practice-centered type are teaching materials in which the ratios of lectures and practices are respectively increased in comparison with the standard. In contrast, the balance type refers to a teaching material in which the ratio of lectures and practices is standardized.

Educational Achievement Data

Figure 27:
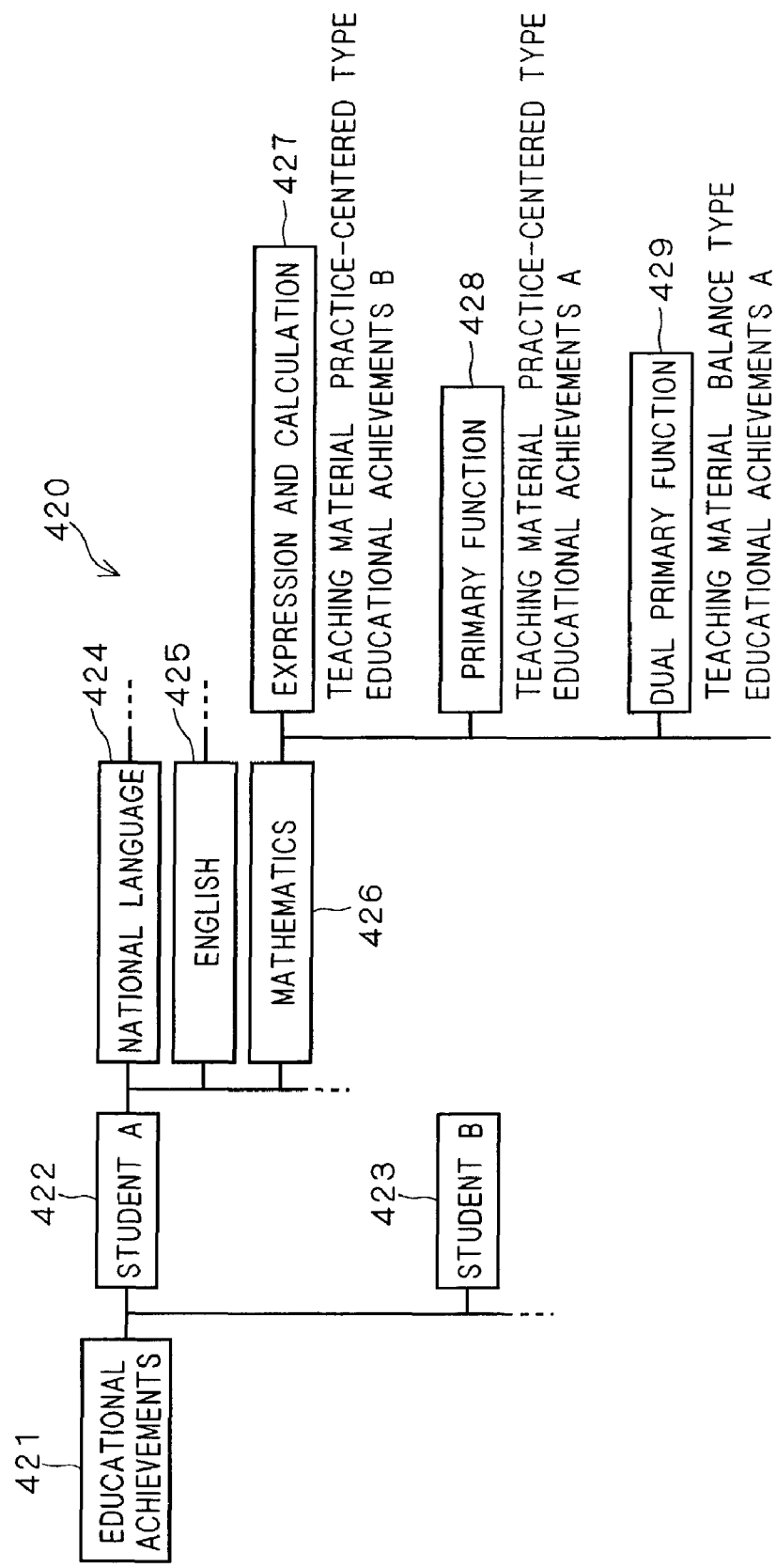
FIG. 27 shows an architectural diagram that indicates an architectural structure of educational achievement data.

With respect to the education achievement data, the teaching materials that are used and the resulting educational achievements are written as XML documents in a classified manner for each of students, subjects and units. FIG. 27 shows a hierarchical drawing of a data structure 420 of the corresponding XML document. As shown in FIG. 27, students segments 422 to 423 are derived from an educational achievement segment 421, and installed, subject segments 424 to 426 are derived from each of the student segments, and installed, and unit segments 427 to 429 are derived from each of the subject segments, and installed. Each of the unit segments 427 to 429 has a teaching material that is used and the resulting educational achievements (A, B, C) written therein. The educational achievements are pieces of information indicating, for example, the degree of understanding of each student, such as the results of tests, and have ranks of three stages, A to C, in accordance with predetermined classifying criteria.

Student Characteristics Data

Figure 28:
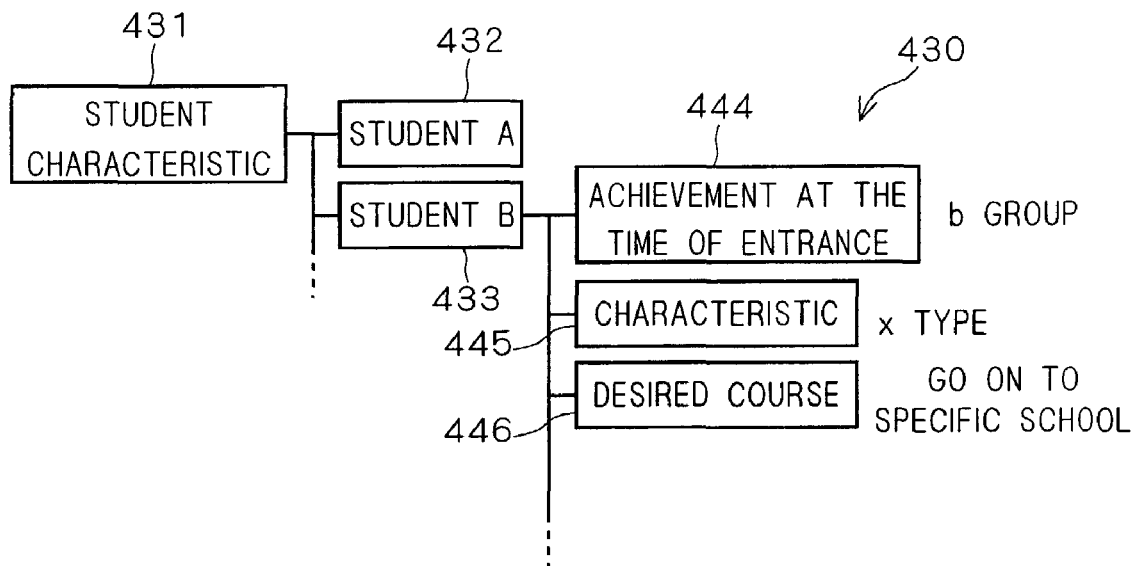
FIG. 28 shows an architectural diagram that indicates an architectural structure of student characteristic data.

Student characteristics data is written as XML documents for each of students with respect to the achievement at the time of entrance, characteristics and desired course of the student. FIG. 28 shows a hierarchical drawing of a data structure 430 of the corresponding XML document. As shown in FIG. 28, students segments 432 to 433 are derived from a student characteristics segment 431, and installed, and characteristics segments such as an achievement upon-entrance segment 444, a characteristics segment 445 and a desired course segment 446, are derived from each student segment, and installed. The achievement at the time of entrance, characteristics and desired course are respectively written in the achievement upon-entrance segment 444, characteristics segment 445 and desired course segment 446 on the basis of predetermined classification criteria.

In the same manner as the first example, the above-mentioned data structure model 131 of the teaching material data is continuously updated in accordance with the evolution of the database system 1. In other words, as will be described later, the KSD model 161, obtained by repeatedly carrying out teaching material selection (conditions)→educational achievement (results) confirming processes, is utilized so that the structure thereof is changed so as to properly provide a teaching material that is optimized in accordance with individuality of each student. Therefore, the data structure 400 shown in FIG. 26 is in the initial state, and changed as operational past results of the database system 1 are accumulated.

2.2 Database Operation

User Interface

In the same manner as the first example, the database system 1 of the second example uses a GUI. The user is allowed to view teaching materials stored in the data store 130 by inputting predetermined items through a teaching-material inquiry screen 450, and can register educational achievements by the use of the teaching material through an educational achievements screen 470. Referring to screen display examples of the GUI, the following description will discuss methods for making inquiries about teaching materials and for registering educational achievements.

Inquiries About Teaching Materials

Figure 29:
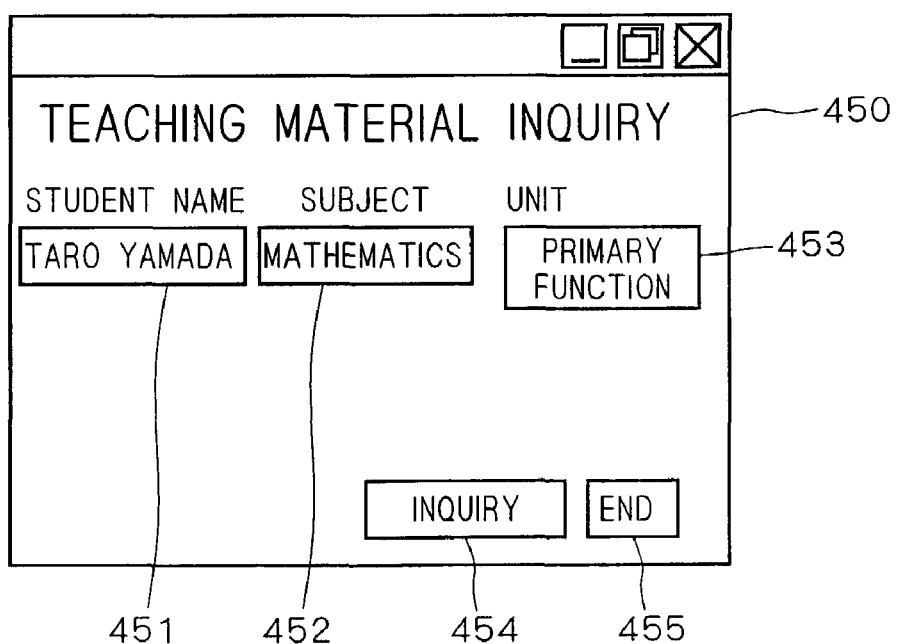
FIG. 29 shows a schematic view that indicates a teaching-material inquiry screen.

FIG. 29 shows a screen display example of the GUI used for inquiries about teaching materials. The teaching-material inquiry screen 450 includes entry spaces, such as a student name space 451, a subject space 452 and a unit space 453. The user (mainly assumed as a teacher) inputs predetermined items in these entry spaces, and presses an inquiry button 454 so that he or she can view a teaching material that is optimized for the student whose name was inputted with respect to the inputted subject and unit, through the GUI. Moreover, he or she can terminate the database operation by pressing an end button 455 (in the following screen display examples also, the end button 455 has the same function).

Teaching-Material Display Screen

Next, FIG. 30 shows a teaching-material display screen 460 displayed by the GUI. FIG. 30 exemplifies a case in which an optimized "lecture-centered type" teaching material is displayed. Of course, for the student to which a "practice-centered type" material is suitably applied, an "practice-centered type" material is displayed. Moreover, in the case when optimal teaching materials are not estimated because of the initial state of the database application, all the "lecture-centered type", "balance type" and "practice-centered type" teaching materials are displayed. In this case, the user properly makes a selection from the teaching materials thus displayed, and uses this for instructing the student.

In addition to the student name, subject and unit, the teaching-material display screen 460 also displays the specific contents of the teaching material, cautions upon instruction by using the teaching material and samples of examinations are displayed.

Educational Achievements Registration

FIG. 31 shows an educational-achievements registering screen 470 to be used for registering the educational achievements obtained by the application of the teaching material. The educational-achievements registering screen 470 includes entry spaces such as a student name space 471, a teaching material space 472, a degree-of-understanding space 473, a subject space 474 and a unit space 475. The user is allowed to add new data to the educational achievement data stored in the data sore 130, by pressing a register button 476 after having inputted predetermined items into these entry spaces. Here, the addition of the new data can also be carried out by using the translator 140 on the basis of another electronic data containing the same contents as the inputted items.

2.3 Query

Teaching-Material Inquiry and Output

Figure 32:
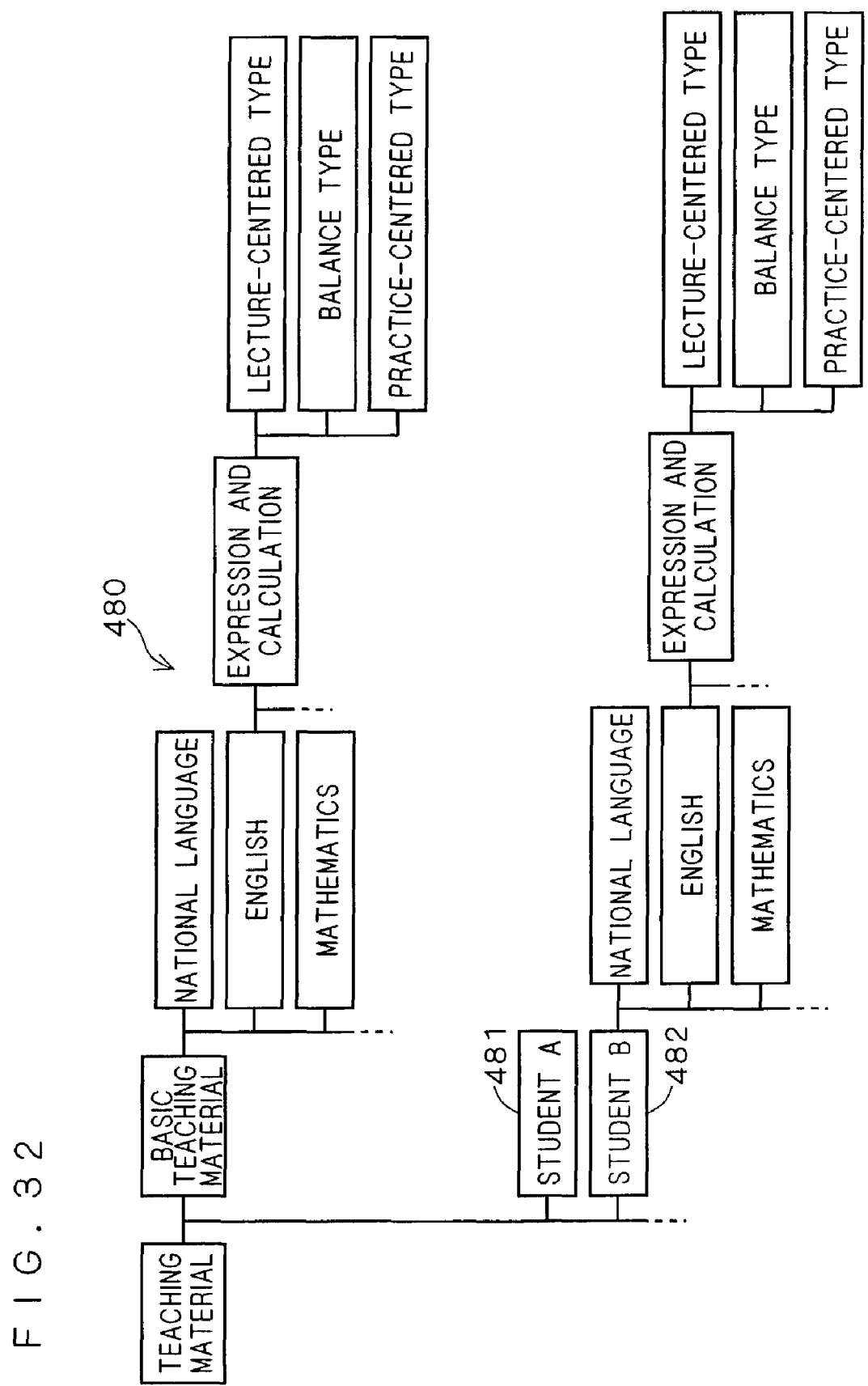
FIG. 32 shows an architectural diagram that indicates an architectural structure of teaching-material data.

Upon receipt of a teaching-material inquiry from the user, the execute composition unit 120 converts the inquiry to a query, and outputs the resulting signal to the query engine mining unit 150. Successively, the query engine mining unit 150 confirms whether or not a student segment corresponding to the inputted student name exists in the same hierarchy as the basic teaching material segment (see data structure 480 in FIG. 32; additionally, the structure change from the data structure 400 to the data structure 480 will be described later). In the case when the corresponding student segment exists, the query engine mining unit 150 extracts a teaching material corresponding to the inputted subject and unit that is located on a lower layer of the segment, and outputs the resulting signal to the execute composition unit 120. In the case when no corresponding segment exists, the query engine mining unit 150 extracts a teaching material corresponding to the inputted subject and unit that is located on a lower layer of a basic teaching-material segment, and outputs the resulting signal to the execute composition unit 120.

The execute composition unit 120 converts the inputted teaching material to a format suitable for viewing processes, such as an HTML (Hyper Text Markup Language) format, and outputs the resulting signal to the user interface 110. The results of this output correspond to the teaching-material display screen 460 shown in FIG. 30.

2.4 Construction of KSD Model

Dispersion Analysis

In the KSD model 161 in the second example, the relationship between characteristics of a student and an effective teaching material is accumulated. With respect to the characteristics of the student, all the items written in the student characteristics data accumulated in the data store 130 may be considered; however, only the case in which the student's achievements at the time of entrance are taken into consideration will be described.

First, the KSD model creating unit 162 analyzes the achievements at the time of entrance of all the students and influences given by the applied teaching material to the educational achievements for each of the units. Thus, a teaching material (results) which can maximize the educational achievements for each level of the achievements at the time of entrance is calculated for each of the units. This process corresponds to an analyzing process of logical paths A(i)→B(i) described in the embodiment of the present invention. In the analyzing process in the second example, sometimes the results show that no difference in the educational achievements is obtained by the teaching material; however, in such a case, supposing that no information has been obtained, processes such as accumulating processes of the succeeding KSD model 161 are not carried out.

Figure 33:
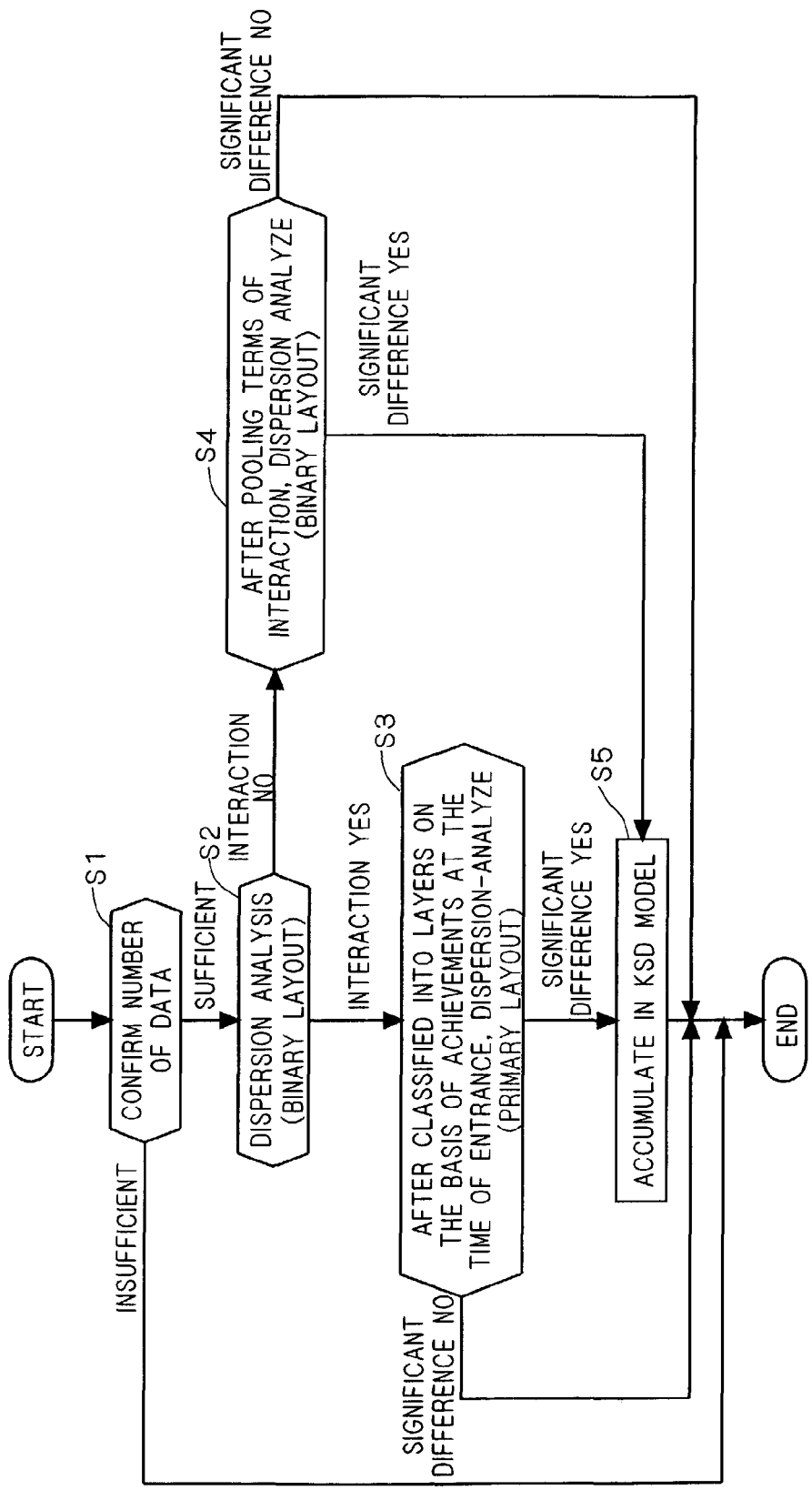
FIG. 33 shows a flowchart that describes a method for analyzing influences of achievements at the time of entrance and teaching material given to educational achievements.

The analyses in the second example are carried out by using a dispersion analysis with the educational achievements being used as an objective variable and the achievements at the time of entrance and the teaching material being used as a description variable. Referring to a flowchart in FIG. 33, the sequence of these processes will be described.

First, at step S1, it is confirmed whether or not the number of data is sufficient. In other words, the number of the current accumulated data is compared with a predetermined threshold value so that a branching process is carried out depending on whether or not data required for the dispersion analyzing processes has been prepared. In the case when the number of the current accumulated data is smaller than the threshold value to make the number of data insufficient, the processes are completed. In other words, the KSD model 161 is not updated. In the case when the number of data is sufficient, the sequence proceeds to the next step S2. Here, the sentence, "the number of data is sufficient", refers to the fact that data can be arranged in a binary layout having repetitions; however, this standard can be altered depending on various-statistical processing methods.

At step S2, a dispersion analysis is carried out with the educational achievements being used as an objective variable while the applied teaching material being used as a description variable that has been binary arranged. Here, the achievements at the time of entrance are read from the student characteristics data stored in the data store 130, and the applied teaching material is read from educational achievement data stored in the data store 130. In other words, the two different data systems are combined so that the analyzing process is carried out.

As a result of the dispersion analyses, in the case when it is determined that there is a correlation between the achievements at the time of entrance and the applied teaching material (the optimal teaching-material selection criteria is different depending on the achievements at the time of entrance), the sequence proceeds to step S3. In contrast, as a result of the dispersion analyses, in the case when it is determined that there is no correlation between the achievements at the time of entrance and the applied teaching material (the optimal teaching-material selection criteria is not influenced by the achievements at the time of entrance), the sequence proceeds to step S4.

At step S3, the relationship between the applied teaching material and the educational achievements is analyzed for the respective achievements at the time of entrance. In other words, the educational achievement data is classified into architectural layers for the respective achievements at the time of entrance, and dispersion-analyzed. This dispersion analysis is a one-way layout dispersion analysis in which the applied teaching material is used as a description variable with the achievements at the time of entrance being used as an objective variable. When it is determined in this dispersion analysis that there is any significant difference, the sequence proceeds to step S5. When it is determined that there is no significant difference, the process is terminated.

At step S4, the dispersion analysis is again carried out with interaction terms being pooled (interaction terms are included in error terms). When it is determined in this dispersion analysis that there is any significant difference, the sequence proceeds to step S5. When it is determined that there is no significant difference, the process is terminated.

At step S5, the optimal teaching material is accumulated in the KSD model 161 for each of the achievements at the time of entrance, and the process is completed (the accumulation method will be described later). Of course, in the case when there is no correlation between the achievements at the time of entrance and the optimal teaching material selection criteria, the same teaching method is registered with respect to all the students.

In accordance with the above-mentioned processes, if there is any statistically significant teaching material in its effectiveness, the teaching material can be accumulated in the KSD model 161, and if there is no effective teaching method, the KSD model 161 is not particularly changed.

KSD Model

The KSD model creating unit 162 stores knowledge obtained through the above-mentioned dispersion analyses in the KSD model 161. The knowledge is obtained by using a neural network in the same manner as the first example.

Figure 34:
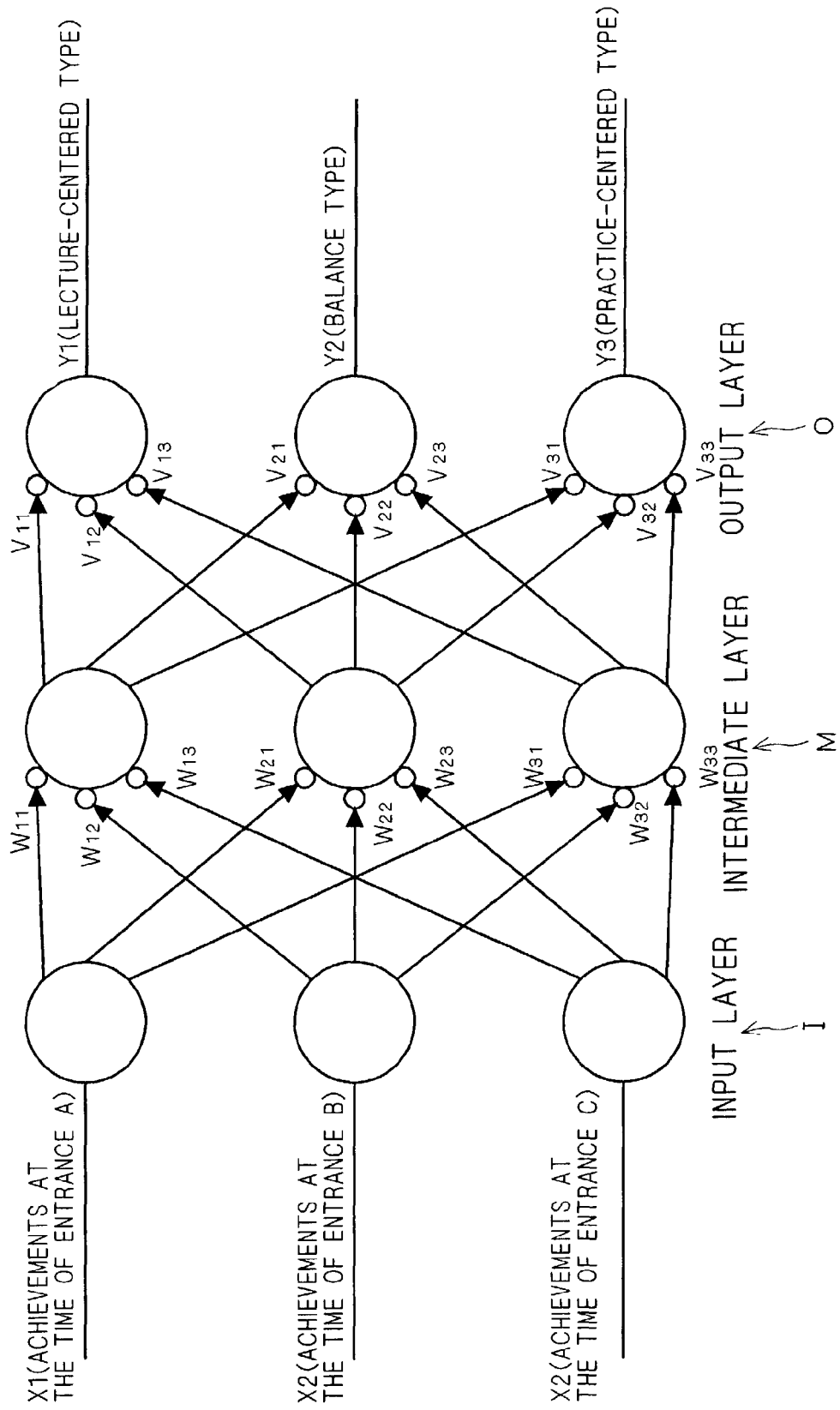
FIG. 34 shows a schematic view that describes a neural network.

FIG. 34 shows a schematic view of the neural network used in the second example. Since the neural network in the second example is similar to that of the first example, only the points different from the first example will be described, and the detailed descriptions of the other points will not be repeated.

In the same manner as the first example, the neural network of the second example is a perceptron constituted by three layers, that is, an input layer I, an intermediate layer M and an output layer O. In the second example, the respective words, "achievements at the time of entrance A", "achievements at the time of entrance B" and "achievements at the time of entrance C" are made in association with inputs X1, X2 and X3 respectively. In the same manner, the respective words, "lecture-centered type", "balance type" and "practice-centered type" are made in association with outputs Y1, Y2 and Y3. Each of the inputs X1, X2 and X3 is allowed to have a value "0" or "1" so that inputs corresponding to "achievements at the time of entrance A", "achievements at the time of entrance B" and "achievements at the time of entrance C" are respectively indicated by $(X1, X2, X3)=(1,0,0),(0,1,0),(0,0,1).$ Each of the outputs Y1, Y2 and Y3 is allowed to have a value "0" or "1" so that inputs corresponding to "lecture-centered type", "balance type" and "practice-centered type" are respectively indicated by $(Y1, Y2, Y3)=(1,0,0),(0,1,0),(0,0,1).$ Different from the first example, two or more of X1 to X3 are not allowed to take a value of 1 simultaneously. For example, inputs, such as $(X1, X2, X3)=(1, 1, 0)$, never exist. In contrast, with respect to the output elements Y1 to Y3, two or more of these are allowed to have a value of "1" simultaneously. The case in which two of more of these have a value of "1" simultaneously indicates that the neural network predicts there are a plurality of effective teaching methods.

A teaching signal of the neural network of the second example represents the results obtained from the above-mentioned dispersion analysis. In other words, the effective teaching material is analyzed for each of the achievements at the time of entrance that has been analyzed for each unit, and this process corresponds to analyses from conditions A(i) to the results B(i) by using the index i described in the embodiment as a unit. The neural network of the second example has a function for specifying a general mapping f: A→B on the basis of the results of analysis from conditions A(i) to the results B(i). Here, with respect to the learning method, the same method as described in the first example can be applied.

As the neural network repeats the learning processes (that is, as the teaching material selection→educational achievements inputs are repeated), it is possible to improve the degree of approximation of the mapping from the conditions (achievements at the time of entrance) to the results (optimal teaching material) in the realization store 160. In other words, when achievements at the time of entrance of a student are found, it is possible to estimate an optimal teaching material more accurately. Moreover, even in the case when the relationship between the achievements at the time of entrance and the optimal teaching material is changed little by little (for example, in the case when the contents to be taught become abstract little by little, with the result that, with respect to both of the students having low achievements at the time of entrance and high achievements at the time of entrance, no educational achievements are obtained without using the practice-centered teaching method), since the KSD model 161 can carry out an estimating process appropriately, the effectiveness of the database system 1 is maintained. In other words, the database system 1, arranged as the second example, can properly deal with dynamic changes in educational environments. From this point of view, the database system 1 arranged as the second embodiment is different from a conventional search engine which can reduce time-consuming retrieval tasks by simply replacing a teaching material by electronic data and a conventional statistical processing device which analyzes the past learning achievements.

One of the points in which the construction of the KSD model of the second example is different from the first example is that, upon specifying a logical model, a plurality of different data systems, such as teaching material data, educational achievement data and student characteristics data, are referred to. By the reference to a plurality of pieces of data, that is, so-called multi-dimensional reference, the database system 1 is allowed to specify a higher-degree logical model, that is, a creation of the KSD model 161.

2.5 Evolution of Data Structure Model

In the second example, the KSD model 161 thus created is used for updating the data structure model 131 of teaching material data. The following description will discuss a method for updating the data structure model 131.

First, the structure-change determining unit 171 acquires an effective teaching material for each of the achievements at the time of entrance from the KSD model 161 every predetermined time interval. In other words, the output that is obtained when inputs (X1, X2, X3) are given to the neural network is acquired. Simultaneously, the achievements at the time of entrance of each student, described in the student characteristics data, are acquired. On the basis of these data, an effective teaching method is determined for each of the students.

Next, referring to the data structure model 131 of the teaching data, the structure-change determining unit 171 confirms whether or not the student segment in which the optimal teaching material is written exists in the same hierarchy as the basic teaching material segment. If not, student segments 481 and 482 bearing the student name are added to the same hierarchy as the basic teaching material segment. Moreover, a structure in which the teaching material portion on the lower layer of the basic teaching material segment is optimized for the student is added to the lower layer of the student segment. In contrast, if it exists, on the basis of the contents of the latest KSD model 161, the data structure model 131 is updated (see FIG. 26 and FIG. 32). Thus, a teaching material optimized for each student is written in the teaching material data while being updated on demand.

These student segments 481 and 482 for each individual student are used when the user makes an inquiry about a teaching material through database operations as described earlier. In other words, in the case when the teaching material for the student relating to the inquiry is written, the contents thereof are displayed. In contrast, if no written data exists, the basic teaching material is displayed.

Such a structure change allows the user to acquire the teaching material optimized for the student at a higher speed in comparison with the case in which the KSD model 161 is referred to individually for each of the students. Moreover, even the teaching material, once determined, can be continuously updated to more appropriate contents in accordance with changes in educational environments. Moreover, in the initial state in which learning processes of the KSD model 161 have not progressed so much, in most cases, a plurality of teaching materials, as they are, may be outputted; however, even in such a case, skilled teachers repeat the teaching-material selection, instruction and educational-achievements registering processes so that educational know-how of the skilled teachers can be transferred to the KSD model 161. Thus, it becomes possible to allow even a non-experienced teacher to select appropriate teaching materials.

In the above description of the second example, only the achievements at the time of entrance of students are taken into consideration; however, student's characteristics and desired courses may be taken into consideration so as to provide more appropriate structuring processes.

2.6 Extension Functions

The database system in accordance with the second example makes it possible to provide extension functions other than the retrieval function to the user by utilizing the KSD model 161. This section will describe specific examples of such extension functions.

Export, Import and Combination of KDS Models

In the KSD model 161 of the second example, teaching-material data, educational achievement data and student characteristics data are stored in a separated manner. Therefore, the KSD model 161 is applied not only to a specific school, but also to other schools in its educational practices. For this reason, in the same method as the first example, logical models 6 (KSD model 161) may be exported or imported to and from database systems (the same kind of database systems) of other schools. Moreover, the KSD models 161 can be combined between a plurality of schools. Thus, even in a small-size school in a local area, it is possible to carry out an optimal teaching-material selection.

Third Example

Service Manual Database System for Copying Machine

The database system 1 in accordance with the third example forms a database system for managing a working manual (hereinafter, referred to simply as "service manual") for a service person who carries out regular maintenance services of a copying machine placed at a customer. The database system 1 of the third example gives instructions for a regular maintenance service method of the copying machine to the service person. Moreover, the service person records the contents of jobs actually executed at the customer side.

The following description will discuss the database system 1; however, with respect to those points that are the same as those of the first and second examples, the detailed description thereof will not be repeated.

3.1 Portable Information Terminal

Hardware

Figure 35:
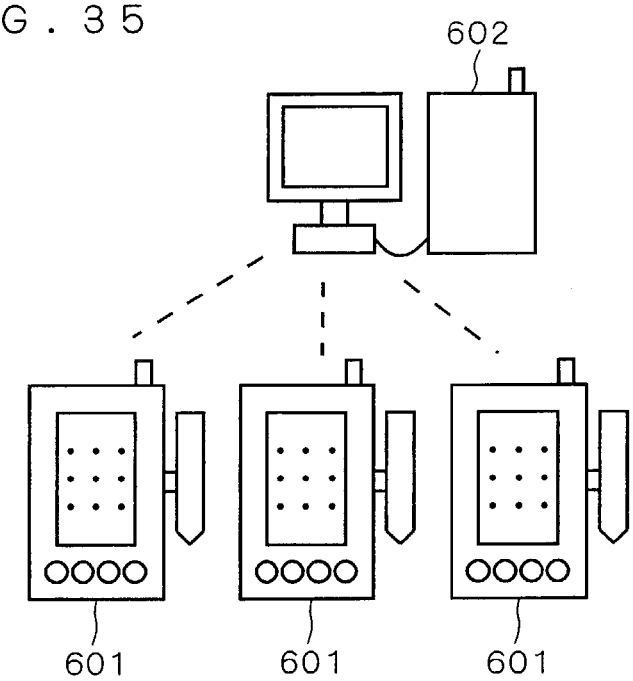
FIG. 35 shows a schematic view that describes a hardware configuration of a database system in accordance with a third example.

FIG. 35 shows a schematic view that indicates a hardware construction of a database system 1 designed as a third example.

The service person receives regular maintenance instructions for each of copying machines through a portable information terminal 601. The regular maintenance instructions are transmitted from a database server 602 that communicates with the portable information terminal 601. In the database system 1 in accordance with the third example, the communications between the portable information terminal 601 and the database server 602 are carried out through public telephone lines.

Figure 36:
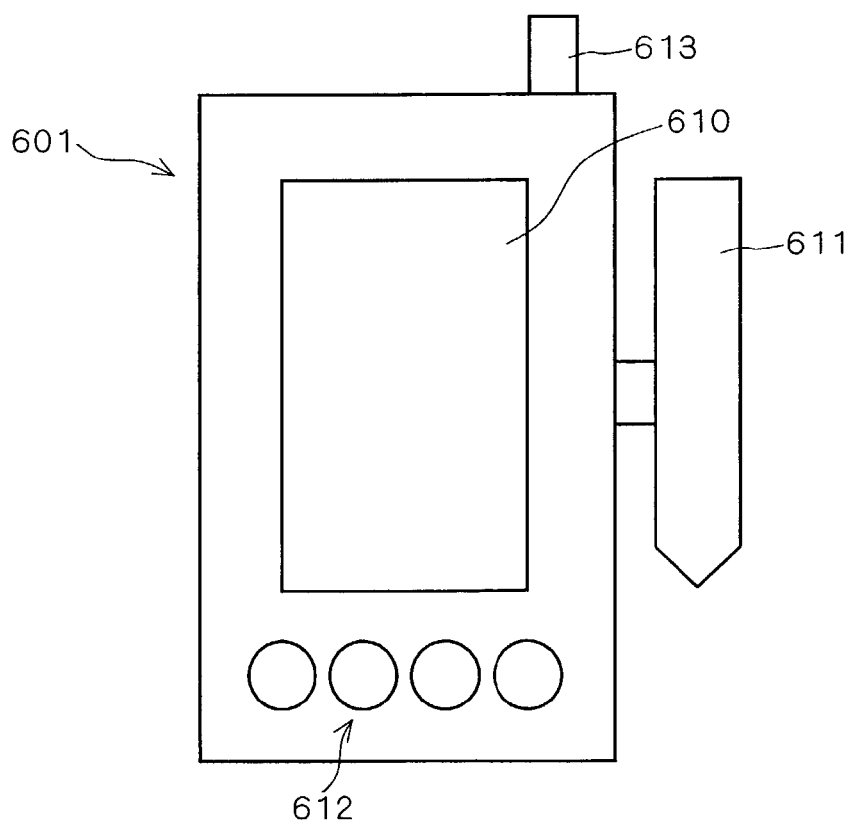
FIG. 36 shows an outside view that describes a portable information terminal in detail.

Next, referring to an outside view in FIG. 36, the following description will discuss the portable information terminal 601 in detail. The portable information terminal 601 is provided with a liquid crystal monitor 610 on which the regular maintenance instructions are displayed. The liquid crystal monitor 610 is prepared as a touch panel. For this reason, a stylus 611 detachably attached to the portable information terminal 601 main body is used for contacting the liquid crystal monitor 610 so that input operations to the portable information terminal 601 are available through GUI displayed on the liquid crystal monitor 610. Moreover, the portable information terminal 601 is provided with a group of operation switches 612. The service person is allowed to carry out power-supply ON/OFF operations or the like through the group of operation switches 612. In these operation means, a well-known operation system which has been used in various portable information terminals can be adopted.

Moreover, the portable information terminal 601 has an antenna 613 and a built-in RF (Radio Frequency) circuit, not shown, and radio communications are carried out through public telephone lines between the portable information terminal 601 and the database server 602.

Regular Maintenance Instruction Screen

Figure 37:
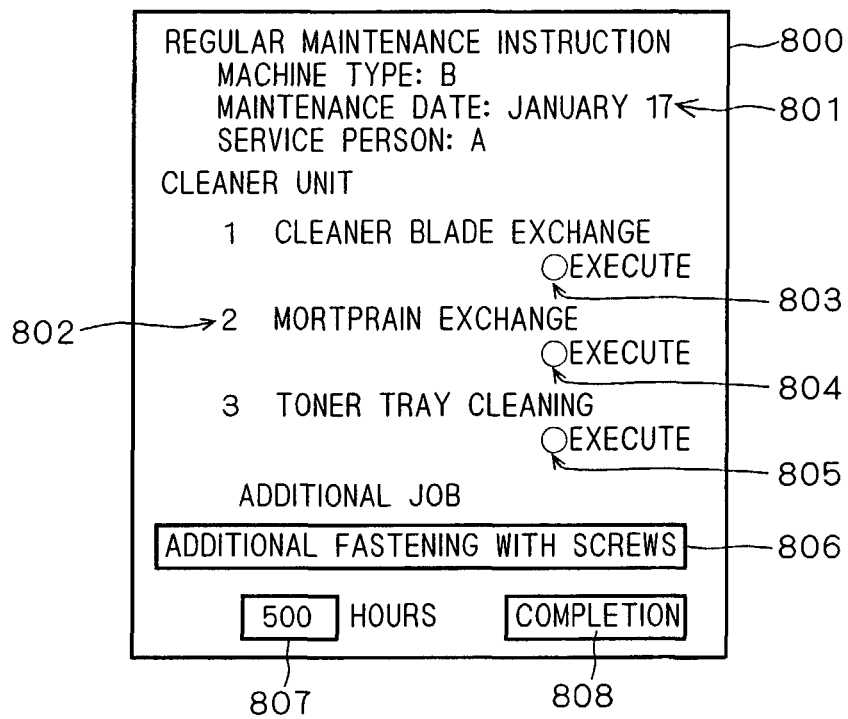
FIG. 37 shows a schematic view that indicates a regular maintenance instruction screen.

FIG. 37 shows a regular maintenance instruction screen 800 displayed on the liquid crystal monitor 610 of the portable information terminal 601. The regular maintenance instruction screen 800 displays maintenance working information 801 including the type of machine, maintenance day, service person, and the like. Moreover, the regular maintenance instruction screen 800 displays specific maintenance job instructions 802. FIG. 37 shows a display including maintenance job instructions 802 with respect to a cleaner unit such as a cleaner blade exchange, a mortprain exchange and a toner tray cleaning operation. Radio buttons 803 to 805, which are used for recording whether or not the corresponding job has been actually executed, are displayed in the vicinity of each of the maintenance job instructions 802. When the service person has actually executed any of these maintenance jobs, he or she presses the vicinity of each of the corresponding radio buttons 803 to 805 of the liquid crystal monitor 610. Thus, the service person can give a check mark indicating the actual execution of the corresponding maintenance job in the radio button.

Referring to the maintenance job instructions 802 thus displayed, the service person executes maintenance jobs for the copying machine. Moreover, in the case when a job other than maintenance job instructions 802 is executed, the contents of the corresponding job are inputted to an additional job space 806. More specifically, for example, in the case when a part exchange is carried out earlier than a predetermined exchange period, the contents of the job are inputted. Furthermore, an operation hour space 807 is also placed on the regular maintenance instruction screen 800. The service person reads the value of a counter indicating the operation hours, which is attached to the copying machine, and inputs the resulting value to the operation hour space 807.

Upon completion of the above-mentioned inputting operations, the service person presses a completion button 808 to transmit information relating regular maintenance jobs to the database server 602.

Failure Repair Informing Screen

Figure 38:
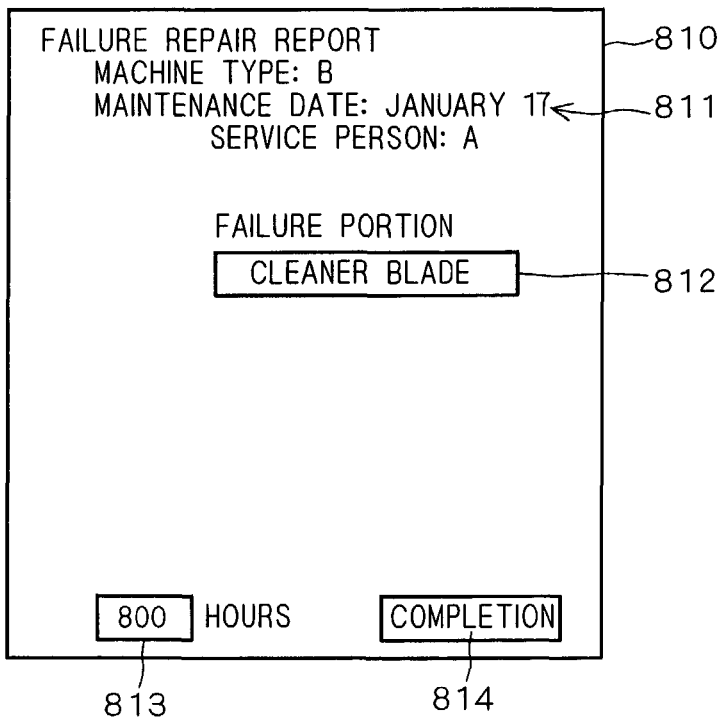
FIG. 38 shows a schematic view that indicates an error repair informing screen.

FIG. 38 shows a failure repair informing screen 810 displayed on the liquid crystal monitor 610 of the portable information terminal 601. The failure repair informing screen 810 is used for informing the results of a failure repairing operation that is carried out in response to a failure in the copying machine, in a manner separated from the above-mentioned regular maintenance jobs.

The failure repair informing screen 810 displays failure repair information 811 such as the type of a machine, date of repair and service person. Moreover, the failure repair display screen 810 is also provided with a failure place entry space 812 and an operation time space 813. Upon completion of the failure repair, the service person inputs the failure place and operation time to the respective failure place entry space 812 and the operation time space 813, and presses a completion button 814. Thus, the failure repair report is transmitted to the database server 602.

3.2 Data Structure

Service manual data, regular maintenance data and failure repair data are stored in the data store 130. A service manual is inputted to the database server 602 by a supervisor of the service person. Moreover, the contents of jobs in the service manual to be executed by the regular maintenance are transmitted to the portable information terminal 601 carried by the service person every regular maintenance, and displayed on the regular maintenance instruction screen 800.

As described above, the regular maintenance data and failure repair data are collected in the database server 602 through the portable information terminal 601 that belongs to each service person.

These pieces of data are maintained while being made in conformity with the data structure model 131 stored in the data store 130. The following description will discuss the data structure model 131.

Service Manual Data

Figure 39:
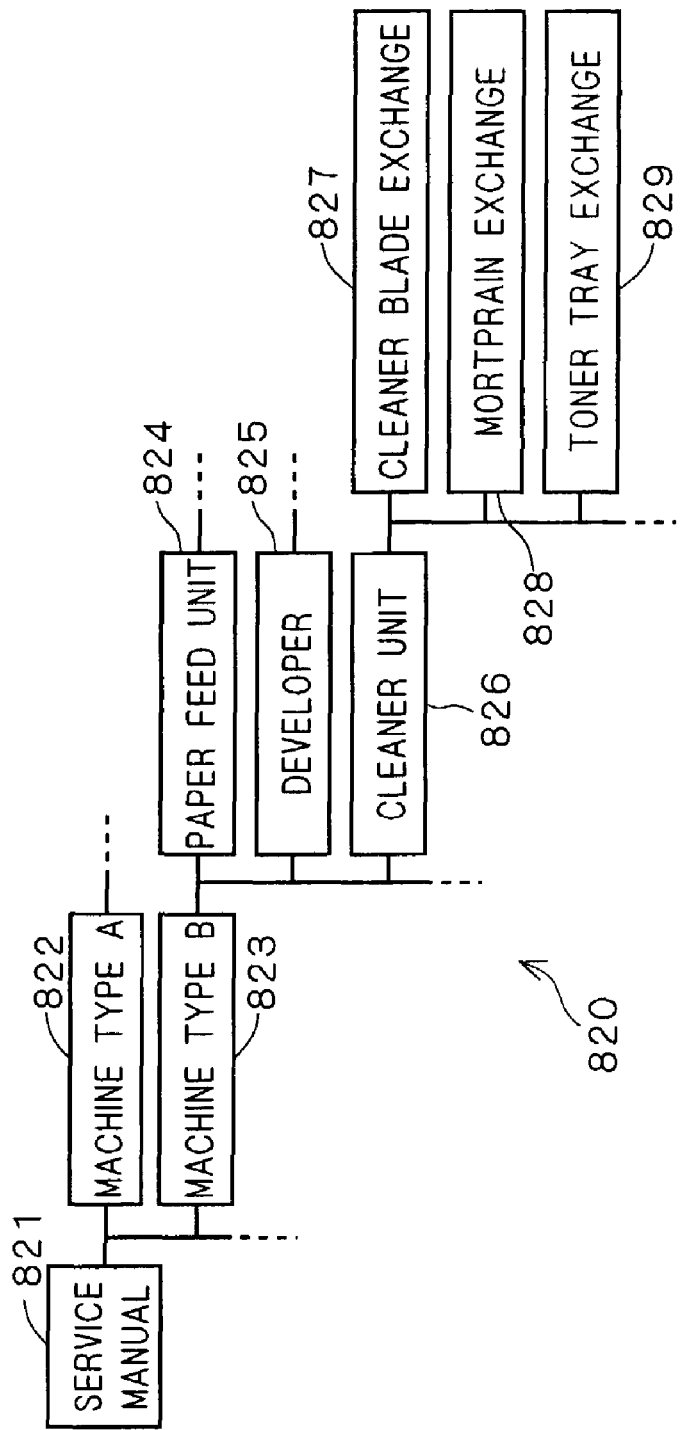
FIG. 39 shows an architectural diagram that indicates an architectural structure of a service manual.

Service manual data is written as XML documents. The XML documents include maintenance portions such as a paper-feed unit, a developing unit and a cleaner unit, and the contents of the regular maintenance jobs such as an exchange of a cleaner blade, an exchange of mortprain and a toner tray exchange, for each of the types of machines. The contents of the description have a data structure 820 shown in a hierarchical drawing in FIG. 39. In other words, the following segments are prepared: machine-type segments 822 and 823 derived from a service manual segment 821, maintenance portion segments 824 to 826 derived from each of the machine-type segments, and regular maintenance job segments 827 to 829 derived from each of the maintenance portion segments. The regular maintenance job segments 827 to 829 include a specific sequence of the regular maintenance jobs and execution intervals, written therein. On the basis of the contents written in the service manual data, the database system 1 transmits to the portable information terminal 601 the contents of the regular maintenance jobs to be executed for each of copying machines. The contents form the above-mentioned regular maintenance instruction screen 800.

Regular Maintenance Data

Figure 40:
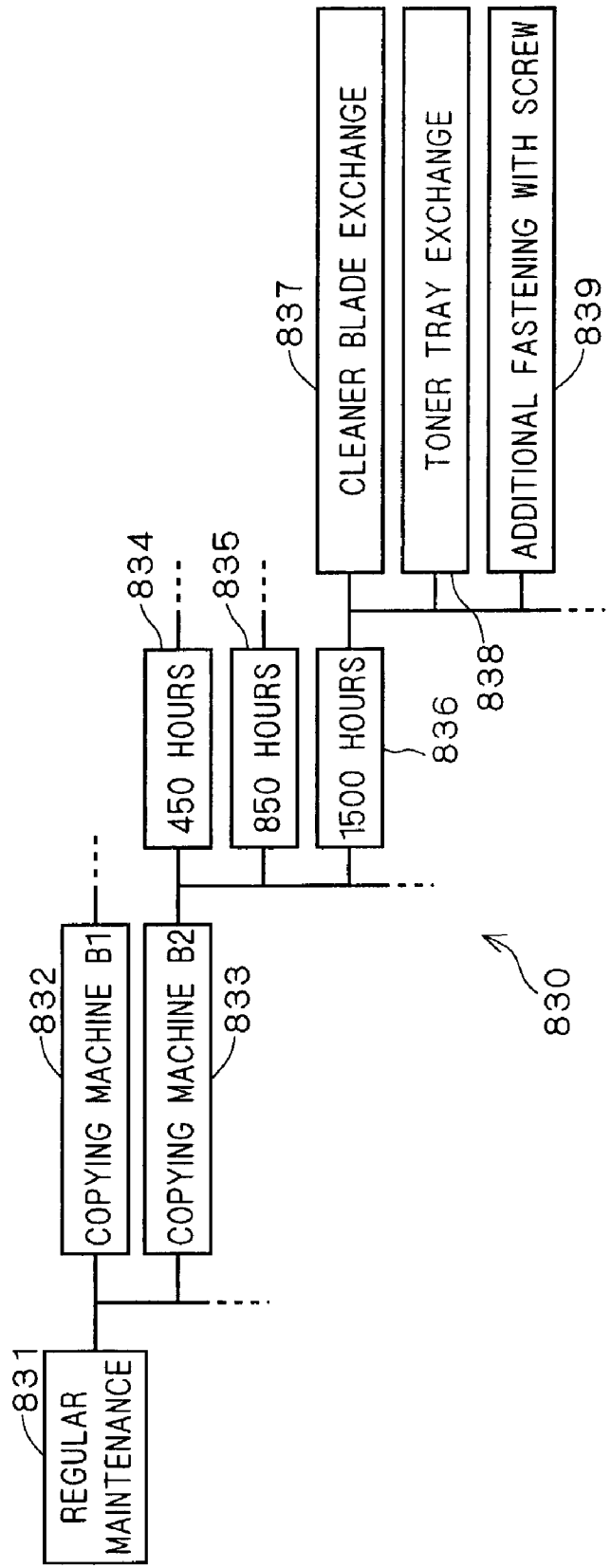
FIG. 40 shows an architectural diagram that indicates an architectural structure of regular maintenance data.

Regular maintenance data is written as XML documents. The XML documents include the contents of regular maintenance jobs such as operation time of a copying machine at the time of regular maintenance, and exchange operations, such as a cleaner blade exchange, a mortprain exchange and a toner tray exchange, that have been executed, for each of copying machines. The contents of the description have a data structure 830 shown in a hierarchical drawing in FIG. 40. In other words, the following segments are prepared: copying machine segments 832 and 833 derived from a regular maintenance segment 831, operation time segments 834 to 836 derived from each of the copying machine segments, and maintenance job segments 837 to 839 derived from each of the operation time segments.

Failure Repair Data

Figure 41:
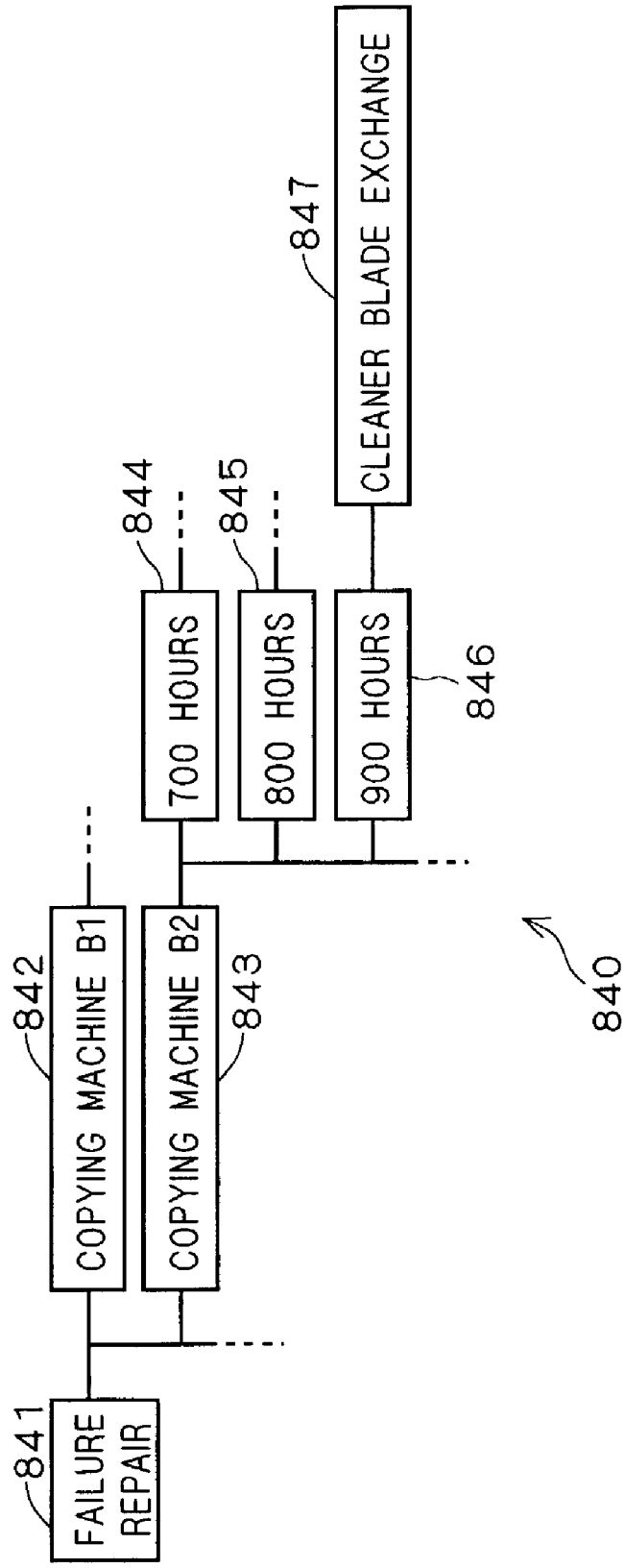
FIG. 41 shows an architectural diagram that indicates an architectural structure of failure repair data.

Failure repair data is written as XML documents. The XML documents include the operation time of a copying machine in which a failure occurred, and a failure-related part such as a cleaner blade, for each of copying machines. The contents of the description have a data structure 840 shown in a hierarchical drawing in FIG. 41. In other words, the following segments are prepared: copying machine segments and 842 and 843 derived from a failure repair segment 841, operation time segment 844 to 846 derived from each of the copying machine segments, and failure-related part segment 847 derived from each of the operation time segments.

3.3 Construction of KSD Model

The relationship between the contents of regular maintenance jobs by service persons and each failure is accumulated in the KSD model 161 in the third example. The following description will discuss specific contents thereof. The relationship is accumulated by using a neural network as shown in the first and second example. In the same manner as the second example, a statistical process may be combined therewith for an assisting purpose.

Event 1: Estimation of Failure Time

Since the service person has inputted operation time of the copying machine through the regular maintenance instruction screen 800, the KSD model creating unit 162 is capable of obtaining the intervals of operation time at which the part has been actually exchanged. Moreover, since the service person has inputted the operation time at which the part had a failure through the failure repair informing screen 810, the KSD model creating unit 162 can specify the time to failure of the part having the failure.

The KSD model creating unit 162 estimates "B10 life" (the operation time in which 10% of all the parts have a failure) on the basis of the time to failure of many failure-related parts, and accumulates the results in the KSD model 161. This estimation process is carried out by using a method such as accumulated hazard analyzing method in which aborting data is taken into consideration. When the operation time after the previous part exchange of each copying machine has reached B10 life, the database system 1 displays a part exchange instruction to the corresponding part on the regular maintenance instruction screen 800.

By using a neural network for data accumulation in the KSD model 161 (part name is used as an input, while time to failure is used as an output), it is possible to carry out part exchanges in an appropriate operation time interval even when the B10 life is prolonged little by little because of the improvement of production quality. Thus, it is possible to prevent an increase in maintenance costs due to unnecessarily frequent part exchanges and an increase in the number of initial failures. Moreover, it is also possible to prevent an increase in failures caused by too long part exchanging intervals. In other words, even in the case when the time to failure in the field is not properly estimated at the time of forming a service manual (for example, in the case when, upon developing a product, an acceleration coefficient estimated by acceleration tests is not appropriate), or even in the case when the time to failure is prolonged because of improvements in quality, the database system 1 makes it possible to instruct an appropriate part exchanging interval by flexibly adapting to changes in the situation.

Event 2: Horizontal Development in Know-How of Excellent Service Persons

In the same manner as event 1, the KSD model creating unit 162 can acquire the mean time to failure of a copying machine and the contents of an additional job for each service persons in charge. By registering this data in the neural network, the KDD model 161 makes it possible to estimate additional jobs which can shorten the time failure. When such additional jobs are also displayed on the regular maintenance instruction screen 800, it is possible to shorten the mean time to failure.

Moreover, even when the improvements in service person's skill and changes in the members take place little by little, the KSD model can properly deal with these so that the database system 1 is allowed to give appropriate maintenance instructions in a manner so as to correspond to dynamic changes in the environment.

3.4 Alteration of Data Structure

In the above-mentioned event 1, when an optimal part exchanging interval is determined, the part exchanging interval written in the service manual data is updated by using this time. Moreover, an additional job segment found in event 2 is added to the service manual. These alterations in the data structure allow the database system 1 to have an improved accessing efficiency to the group of data 132, and consequently to output appropriate data at high speeds.

3.5 Extension Functions

The database system of example 3 also makes it possible to provide various extension functions other than the retrieval function to the user by utilizing the KSD model 161. In other words, in the same manner as the first and second examples, the accumulated KSD model 161 can be applied to another type of machines and another group of service persons. Thus, even when a sufficient data accumulation is not available in the KSD model 161, it is possible to execute appropriate maintenance processes.

Fourth Example

Popular Commodity Managing Database System in Department Stores

A database system 1 in accordance with a fourth example is a database system for managing popular commodities in departments. In particular, the database system 1 of the fourth example makes it possible to analyze purchasing trends of customers, and to provide commodity advertisements suitable for the purchasing trends of customers.

The following description will discuss the database system 1; however, with respect to those points that are the same as those of the first to third examples, the detailed description thereof will not be repeated.

4.1 Portable Information Terminal

Hardware

The database system 1 of the fourth example has the same hardware configuration as the third example. When customers entered a department store, a portable information terminal 601 for receiving advertisements from the department store is given to each of them. The advertisements from the department store are transmitted from a database server 602 that can communicate with the portable information terminal 601. However, different from example 3, communications between the portable information terminal 601 and the database server 602 are carried out not by public telephone lines, but by radio LAN. Moreover, in the database system 1 relating to the fourth example, a camera is attached to the portable information terminal 601 so that the portable information terminal 601 is allowed to acquire an image of the customer to which the portable information terminal 601 is given. The image thus acquired is transmitted to the database server 602, and the operator, who operates the database server 602, specifies characteristics such as sex, age level and costume. The information thus specified is stored in the data store 130. Moreover, since the portable information terminal 601 has a built-in RFID (Radio Frequency Identification) tag used for confirming the customer's purchasing attitudes. Each register in the store has a detection device for the RFID tag so that information relating to a commodity purchased by the customer who carries the portable information terminal 601 is transmitted to the database server 602 together with an ID specified by the RFID tag.

Advertisement Screen

Figure 42:
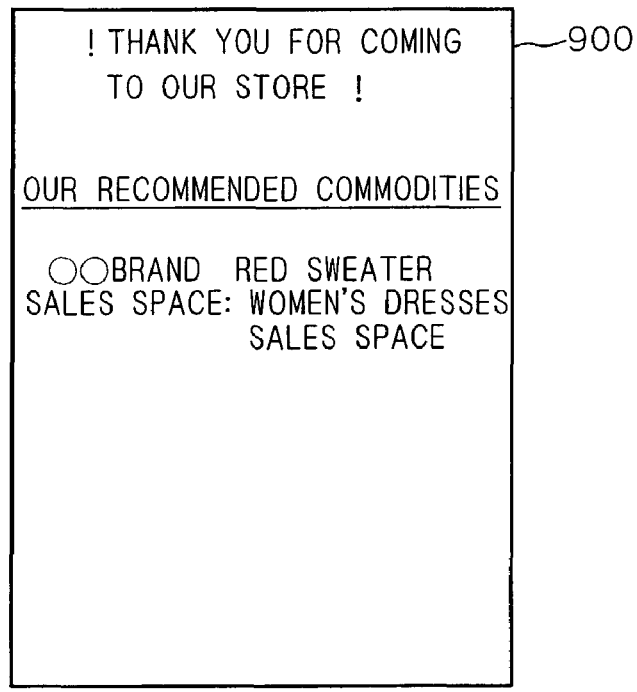
FIG. 42 shows a schematic view that indicates an advertisement screen.

FIG. 42 shows an advertisement screen 900 displayed on the liquid crystal monitor 610 of the portable information terminal 601. The advertisement screen 900 provides advertisements that are optimized for each of the customers thereon. In other words, the advertisement screen 900 of FIG. 42 displays recommended commodities and the selling spaces for each of the customers. Referring to these advertisements, the customer makes some purchases.

4.2 Data Structure Model

Commodity data bearing information relating to commodities displayed in sales spaces of the department store is stored in the data store 130. The commodity data is maintained with being kept in conformity with a data structure model 131 stored in the data store 130. The following description will discuss this data structure model 131.

Commodity Data Structure

Figure 43:
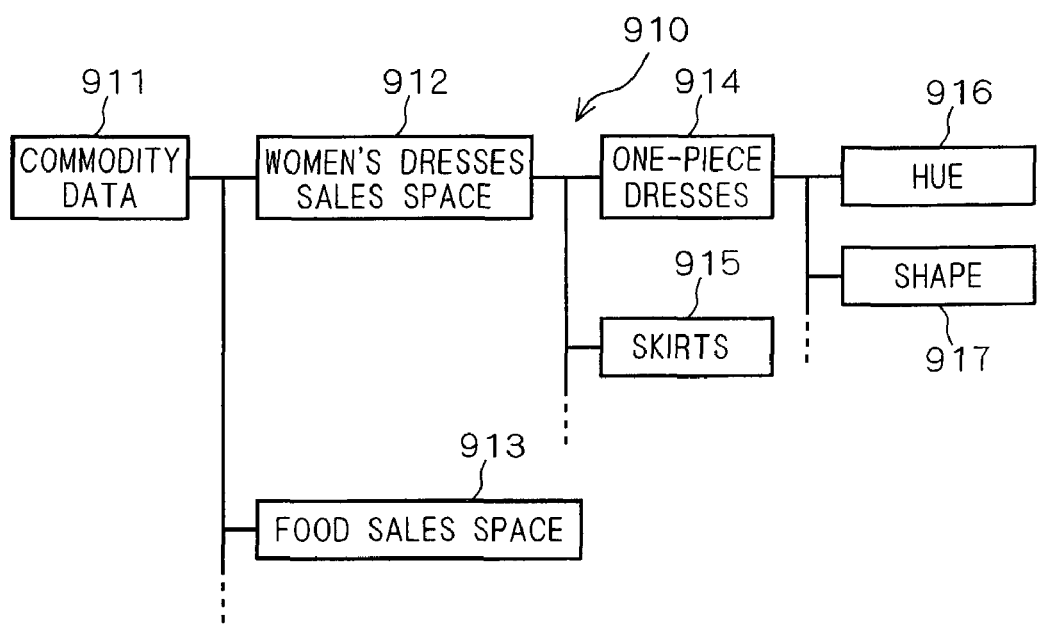
FIG. 43 shows an architectural diagram that indicates an architectural structure of commodity data.

Commodity data is written as XML documents. The XML documents include commodity characteristics such as the kinds of commodities like one-piece dresses and skirts, hues and shapes in a classified manner for each of the commodity sales spaces. The contents of the description have a data structure 910 shown in a hierarchical drawing in FIG. 43. In other words, the following segments are prepared: sales space segments 912 and 913 derived from a commodity data segment 911, commodity segments 914 and 915 derived from each of the sales space segments, and commodity characteristic segments 916 and 917 derived from each of the commodity segments. Information relating to commodities is specifically described in the commodity characteristic segments 916 and 917. The database server 602 transmits information properly selected from the commodity data to the portable information terminal 601 as advertisements. The contents form the above-mentioned advertisement screen 900.

4.3 Construction of KSD Model

The relationship between attributes of a customer and purchasing of commodities is accumulated in a KSD model 161 in the fourth example. The following description will exemplify specific contents thereof. In the same manner as the first to third examples, the relationship is accumulated by using a neural network. In other words, the neural network, which uses attributes of a customer as an input and a purchased commodity as an output, with an actual purchasing action being used as a teaching signal, is utilized.

For example, suppose that a female customer wearing a warm-colored costume in the thirties came, and purchased a red sweater. In this case, in the neural network, with respect to inputs corresponding to attributes of the customer (female, thirties, warm-colored costume), a purchasing action (red sweater) is given as a teaching signal so as to carry out a learning process. Therefore, when customers having the same attributes repeat the same purchasing action, the KSD model 161 is provided with knowledge that female customers wearing a warm-colored costume in the thirties will purchase a red sweater. Of course, when a number of female customers purchased a red sweater irrespective of costumes and ages, the model is provided with knowledge that female customers will purchase a red sweater. Thus, in the case when a female customer wearing a warm-colored costume in the thirties newly comes to the store, it is possible to give an advertisement for red sweaters and the sales space thereof to the above-mentioned advertisement screen 900. Moreover, even when the attributes of the customer and the purchasing action change depending on the current fashion, the database system 1 makes it possible to provide an appropriate advertisement in response to the fashion.

4.4 Change in Database Structure

By changing the commodity data structure 910 on the basis of the above-mentioned KSD model 161, the database system 1 makes it possible to display advertisements at high speeds. For example, as shown in FIG. 44, a customer attribute segment 921 is added to each of the sales spaces so that commodities having a higher possibility of purchase by the customers may be written on its lower-layer segment 922.

4.5 Extension Functions

The database system 1 of the fourth example also makes it possible to provide various extension functions other than the retrieval function to the user by utilizing the KSD model 161. In other words, in the same manner as the first to third examples, the accumulated KSD model 161 can be applied to another store. Thus, even when a sufficient data accumulation is not available in the KSD model 161 in a certain store, it is possible to execute appropriate maintenance processes.

While the invention has been shown and described in detail, the foregoing description is in all aspects illustrative and not restrictive. It is therefore understood that numerous modifications and variations can be devised without departing from the scope the invention.

What is claimed is:

1. A database system comprising:
   a data store for storing a data group;
   a logical model holding unit for holding a logical model which represents logical principles in a data retrieval process in an independent manner from respective data contents of said data group;
   a retrieval logic applying unit which creates a retrieval logic corresponding to a retrieval request on the basis of said logical model, and obtains a retrieval output corresponding to said retrieval request by retrieving said data group in accordance with said retrieval logic;
   a logic analyzing unit which analyzes a logical path connecting conditions to corresponding results in a group of events relating to said data group; and
   a logical model updating unit which updates said logical model so as to be evolved, each time a new combination between new conditions and corresponding new results is given, on the basis of an analysis of a logical path of the new combination carried out by said logical analyzing unit.

2. The database system according to claim 1, further comprising:
   a structure holding unit for holding a data structure of said data group; and
   a structure updating unit for updating said data structure on the basis of said logical model.

3. The database system according to claim 2, wherein said structure updating unit structures a non-structured portion of said data group.

4. The database system according to claim 2, wherein said structure updating unit optimizes said data structure.

5. The database system according to claim 1, wherein said logical model is installed in association with users or groups of users of said database system, so that said logical model is updated for each of said corresponding users or groups of users.

6. The database system according to claim 1, further comprising:
   a guidance generating unit which generates a guidance for a current user of said database system on the basis of said logical model.

7. The database system according to claim 6, wherein said guidance includes a guidance relating to operations of said database system.

8. The database system according to claim 6, wherein said data group accumulates information about events generated outside said database system, and said guidance includes a guidance relating to said events.

9. The database system according to claim 1, wherein said logical model can be exported to another database system.

10. The database system according to claim 1, wherein said logical model can be imported from another database system.

11. The database system according to claim 1, wherein said logical model holding unit is operable to hold a plurality of logical models.

12. The database system according to claim 11, further comprising:
    a combining unit which combines said plurality of logical models.

13. The database system according to claim 1, wherein said logical model is applicable to a plurality of groups of data.

14. The database system according to claim 2, wherein said data structure is a hierarchical data structure.

15. A data retrieval method for a database system, comprising the steps of:
    (a) storing a data group;
    (b) holding a logical model which represents logical principles in a data retrieval process in an independent manner from data contents of said data group;
    (c) creating a retrieval logic corresponding to a retrieval request on the basis of said logical model, and outputting the results of retrieval corresponding to said retrieval request by retrieving said data group in accordance with said retrieval logic;
    (d) analyzing a logical path which connects conditions to corresponding results in a group of events relating to said data group; and
    (e) updating said logical model so as to be evolved, each time a new combination between new conditions and corresponding new results is given, on the basis of an analysis of a logical path of said combination.

16. The data retrieval method according to claim 15, further comprising the steps of:
(f) holding a data structure of said data group;
(g) updating said data structure on the basis of said logical model.

17. The data retrieval method according to claim 15, wherein
said logical model is held in association with users or groups of users of said database system, and
said logical model is updated for each of the users or user groups.

18. The data retrieval method according to claim 15, further comprising the step of:
(h) applying said logical model to a plurality of data groups.

19. The database system according to claim 1, wherein conditions are the contents of the retrieval request and results are data selected by the user from retrieval outputs.

20. The data retrieval method according to claim 15, wherein conditions are the contents of the retrieval request and results are data selected by the user from retrieval outputs.

21. The database system according to claim 1, wherein said database system analyzes a logical path of a new combination between new conditions and corresponding new results each time the new combination is given, and updates said logical model so as to be evolved on the basis of an amendment of said logical model to add a logical path of the combination when the combination does not occur in said logical model.

* * * * *